US011024290B2

(12) United States Patent
Mitchell et al.

(10) Patent No.: US 11,024,290 B2
(45) Date of Patent: *Jun. 1, 2021

(54) WAKEWORD DETECTION USING A SECONDARY MICROPHONE

(71) Applicant: Amazon Technologies, Inc., Seattle, WA (US)

(72) Inventors: Andrew Mitchell, Kenmore, WA (US); Gabor Nagy, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 174 days.

This patent is subject to a terminal disclaimer.

(21) Appl. No.: 16/272,938

(22) Filed: Feb. 11, 2019

(65) Prior Publication Data

US 2020/0258502 A1   Aug. 13, 2020

(51) Int. Cl.
*G10L 21/00* (2013.01)
*G10L 25/00* (2013.01)
*G10L 15/08* (2006.01)
*G10L 15/30* (2013.01)
*G10L 15/22* (2006.01)

(52) U.S. Cl.
CPC .............. *G10L 15/08* (2013.01); *G10L 15/22* (2013.01); *G10L 15/30* (2013.01); *G10L 2015/088* (2013.01); *G10L 2015/223* (2013.01)

(58) Field of Classification Search
USPC ....................................................... 704/275
See application file for complete search history.

(56) References Cited

U.S. PATENT DOCUMENTS

| 9,996,316 | B2* | 6/2018 | Jorgovanovic | ........... G10L 15/22 |
| 10,319,375 | B2* | 6/2019 | Fritz | ................. G10L 15/22 |
| 10,475,449 | B2* | 11/2019 | Lang | ................ H04N 21/42203 |
| 10,477,294 | B1* | 11/2019 | Jorgovanovic | ........ H04R 1/1016 |
| 2015/0370531 | A1 | 12/2015 | Faaborg | |
| 2020/0125162 | A1* | 4/2020 | D'Amato | ................ G06F 3/167 |
| 2020/0184966 | A1* | 6/2020 | Yavagal | .................. G10L 15/30 |
| 2020/0258501 | A1* | 8/2020 | Mitchell | .................. G10L 15/30 |

FOREIGN PATENT DOCUMENTS

WO   2018164841 A1   9/2018

OTHER PUBLICATIONS

International Search Report and Written Opinion dated Jun. 24, 2020 for International Patent Application No. PCT/US2020/012310.

* cited by examiner

*Primary Examiner* — Satwant K Singh
(74) *Attorney, Agent, or Firm* — Pierce Atwood LLP

(57) ABSTRACT

Techniques for capturing spoken user inputs while a device is prevented from capturing such spoken user inputs are described. When a first device becomes incapable of capturing spoken user inputs intended for a system, a second device, for capturing such spoken user inputs, may be identified. The second device may be identified based on the second device being connected to a same vehicle computing system as the first device. The second device may be enabled to capture spoken user inputs, intended for the system, until the first device is again able to capture such spoken user inputs.

20 Claims, 20 Drawing Sheets

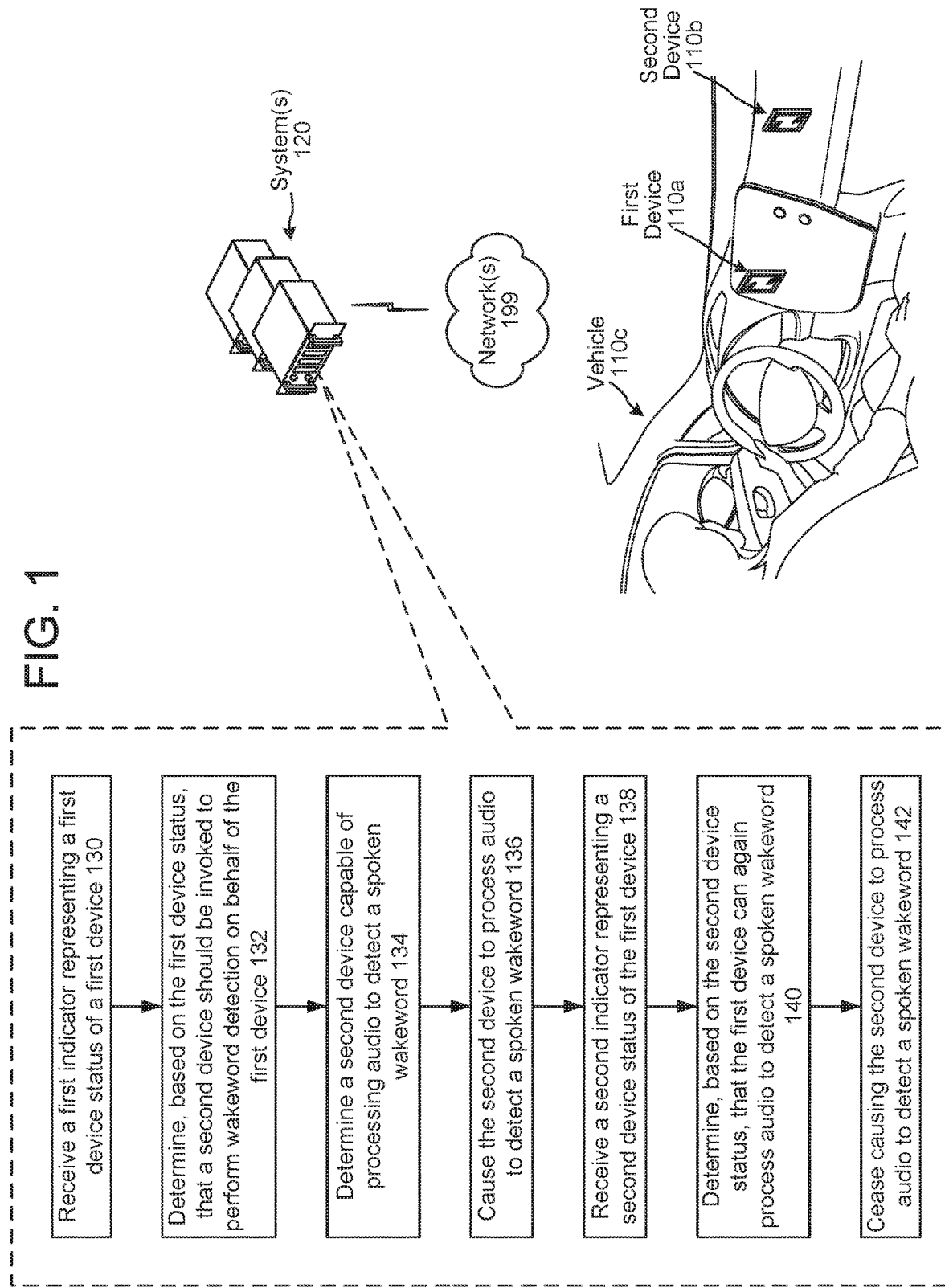

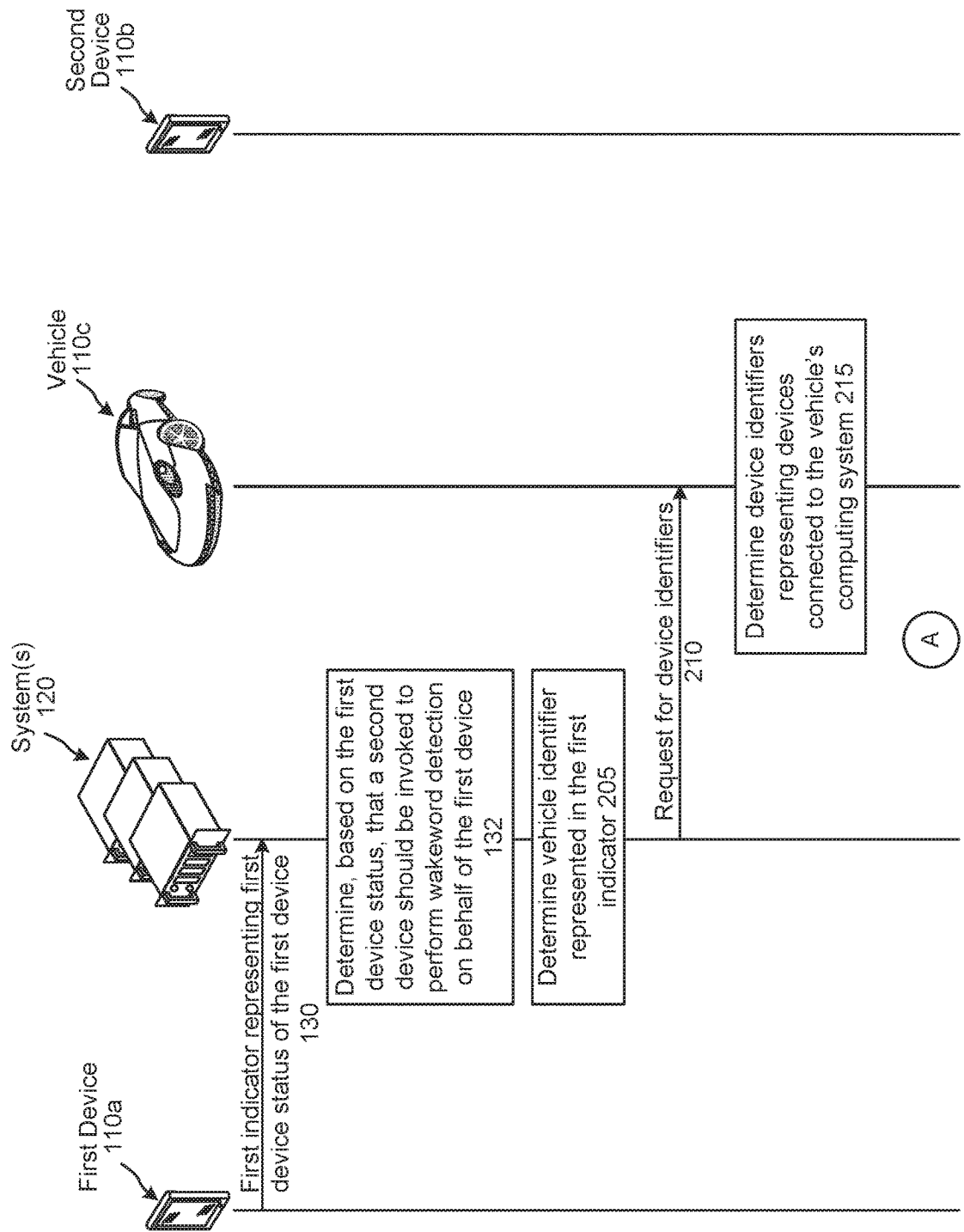

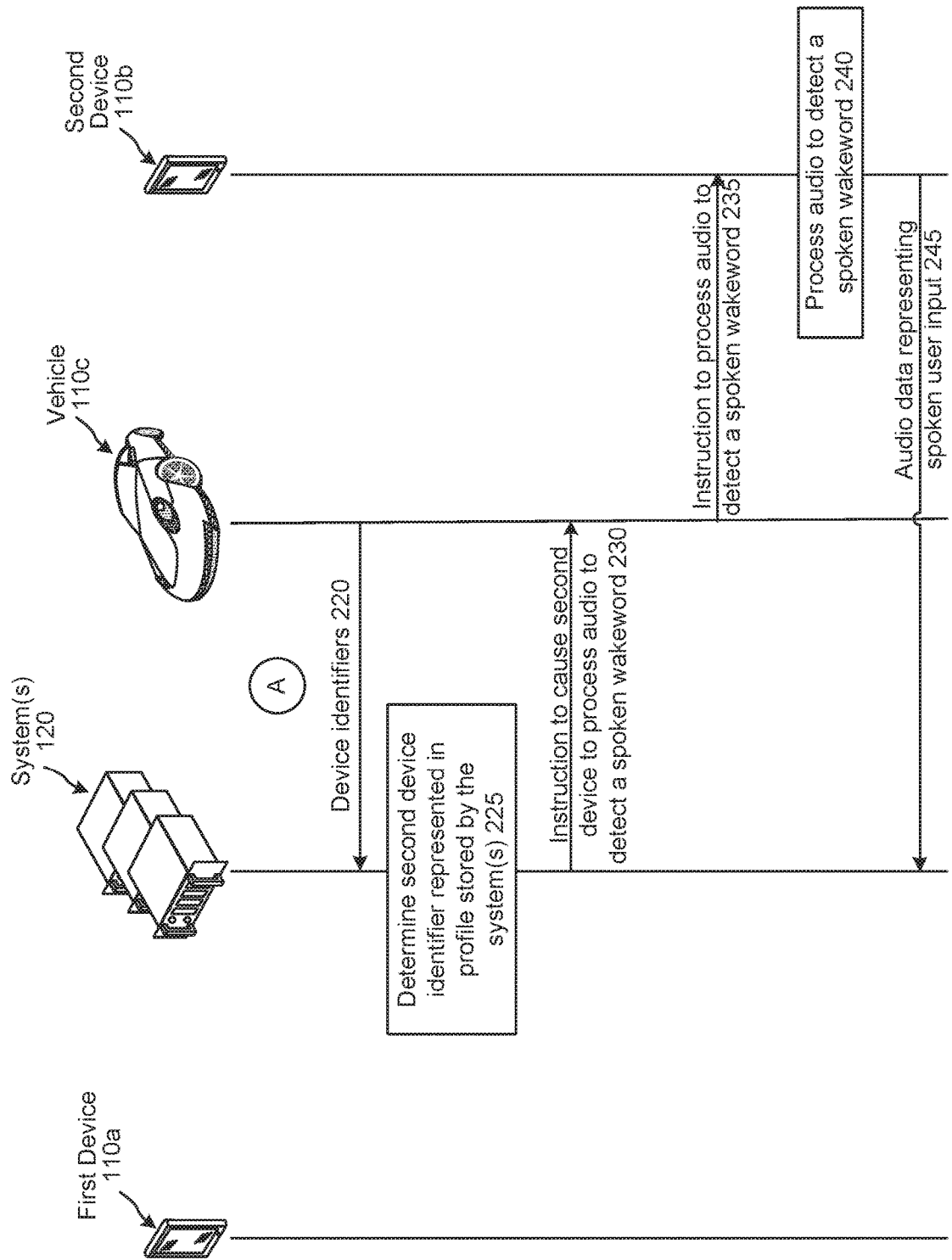

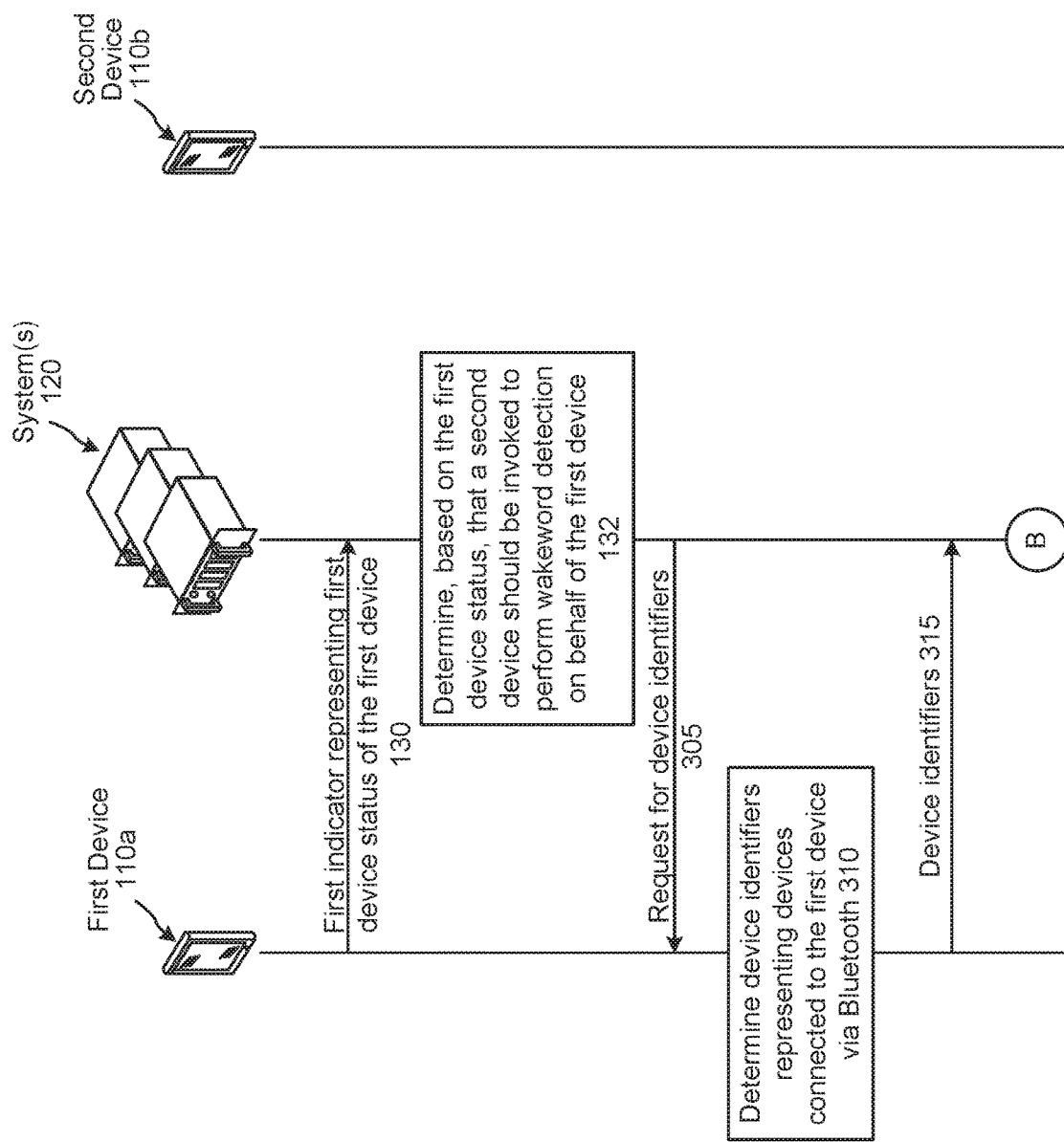

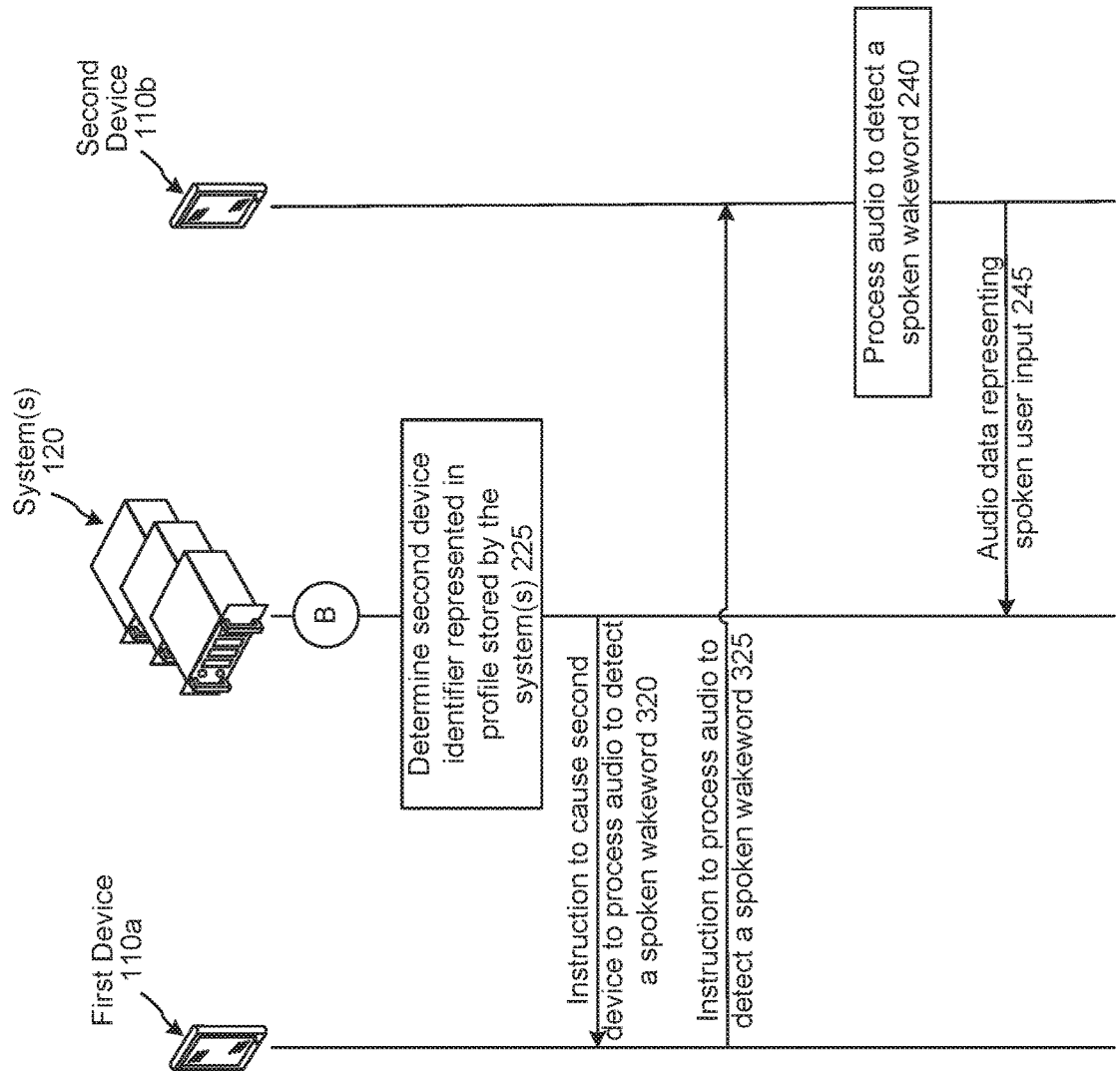

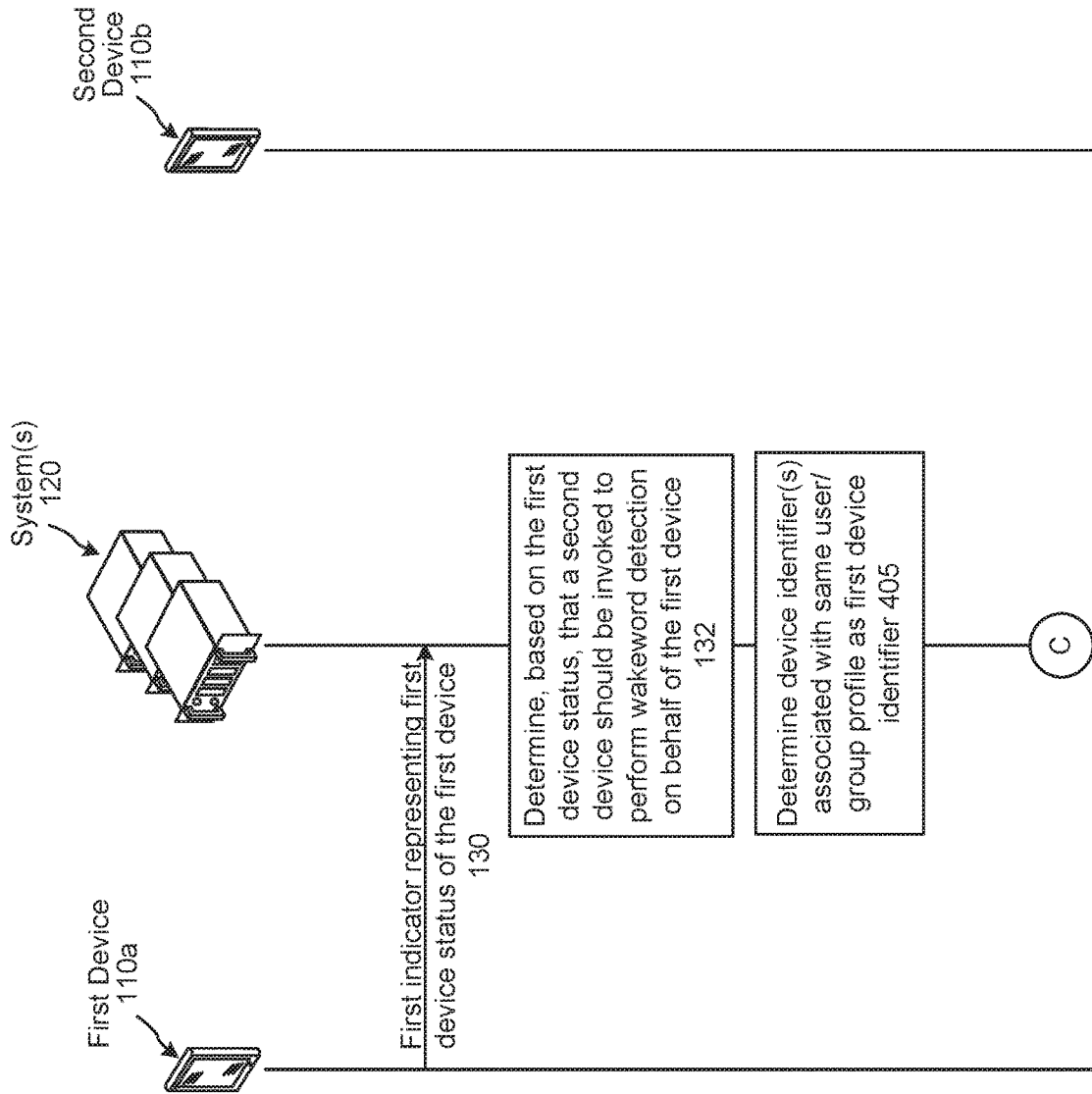

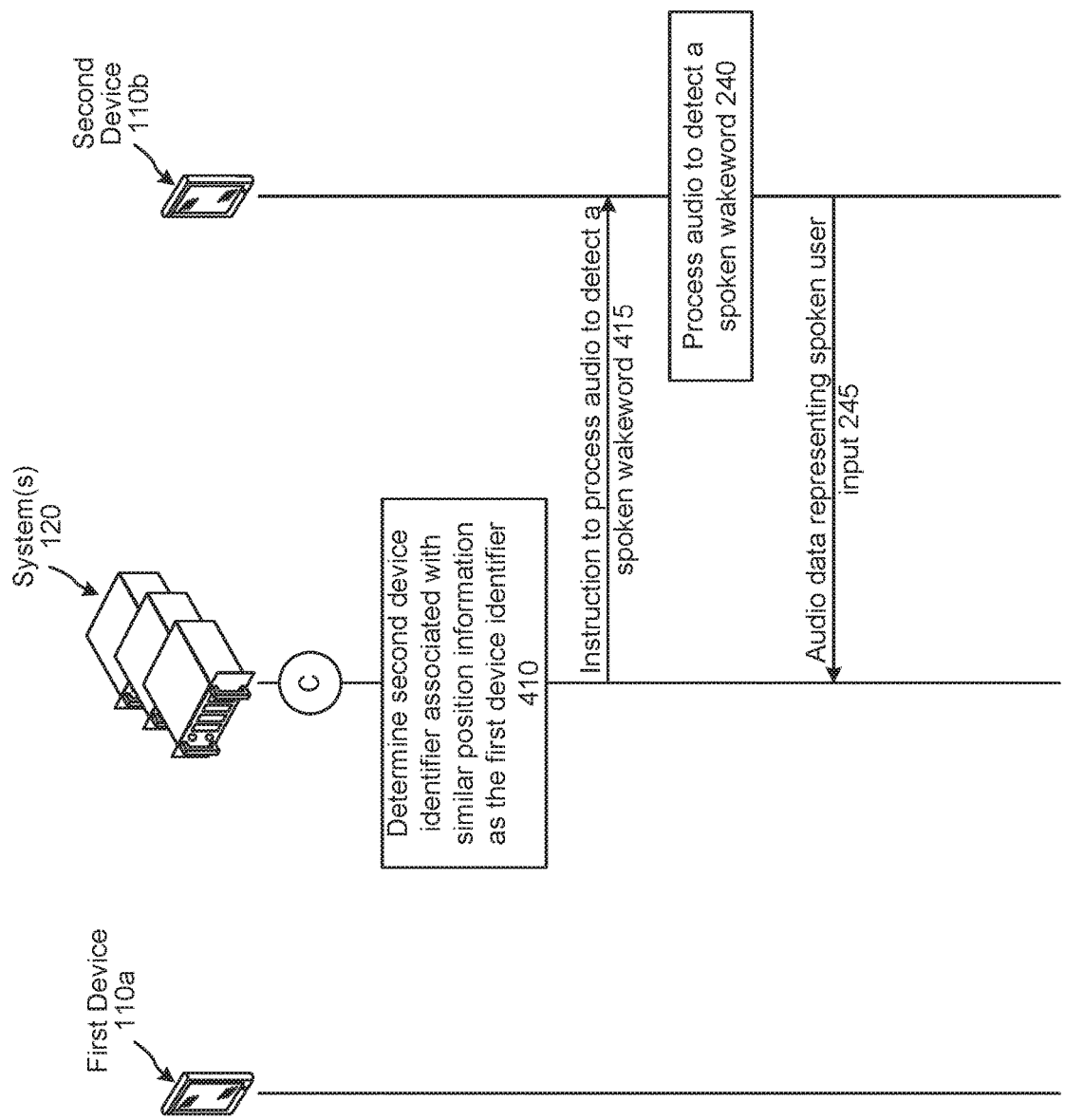

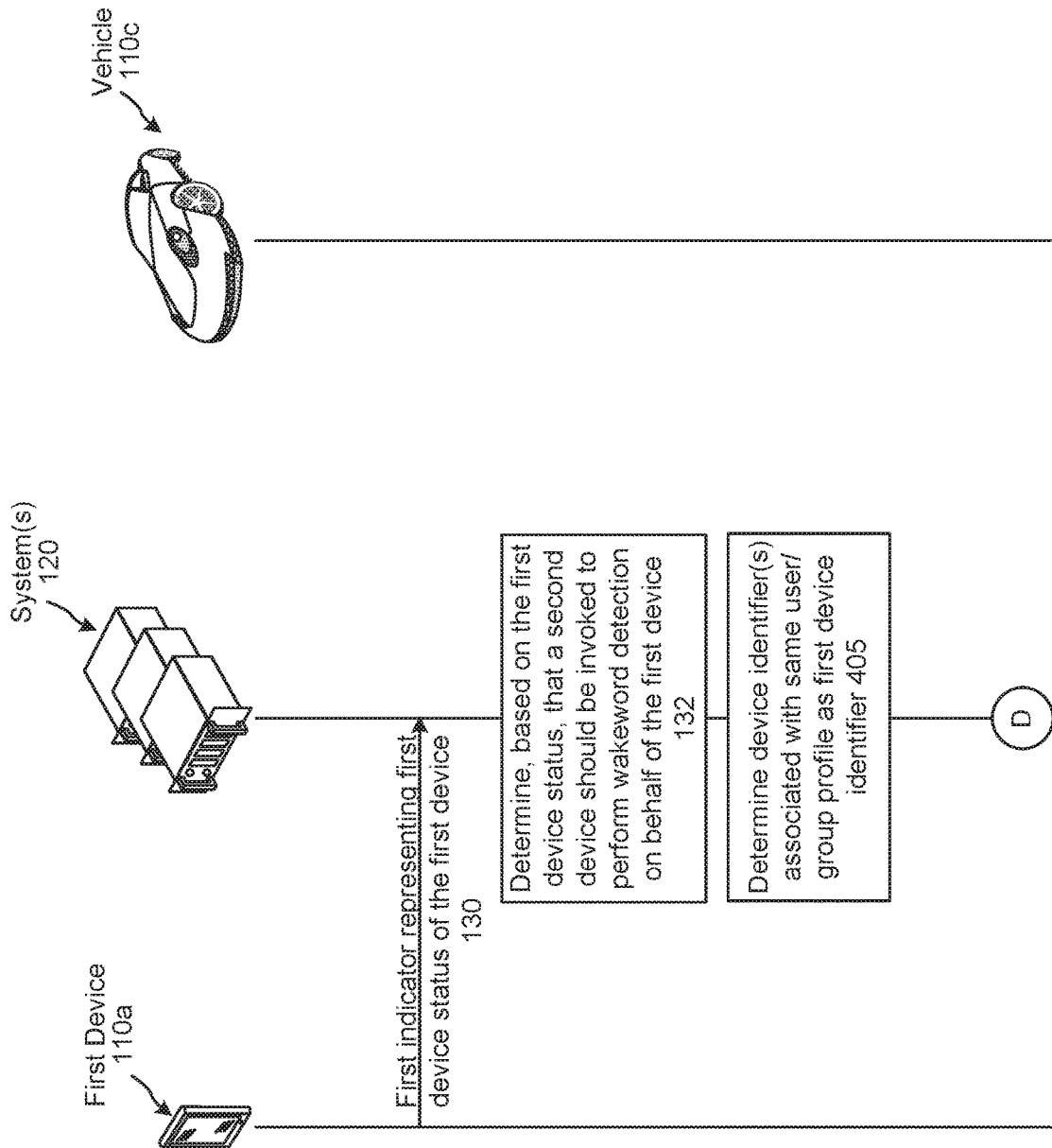

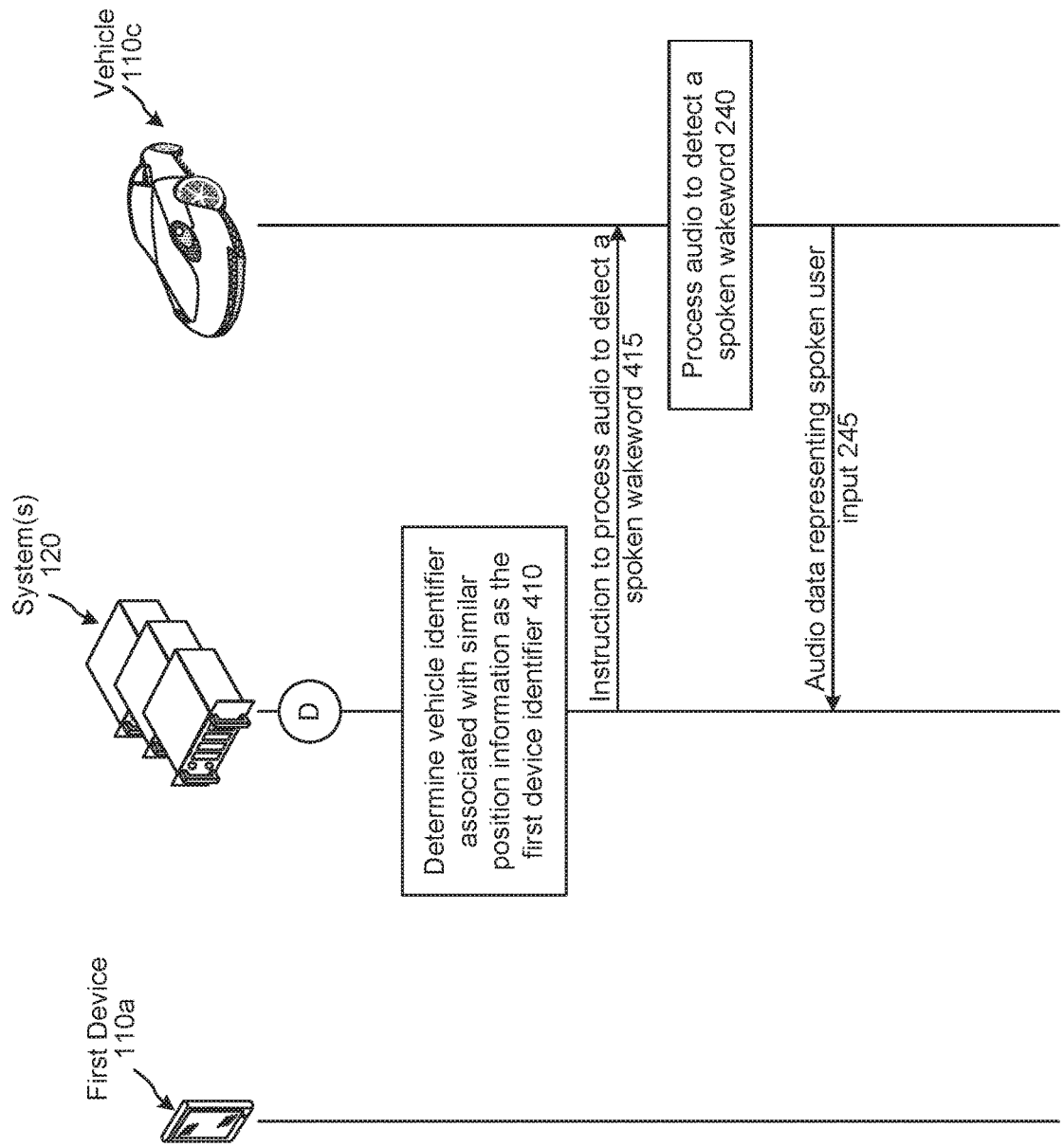

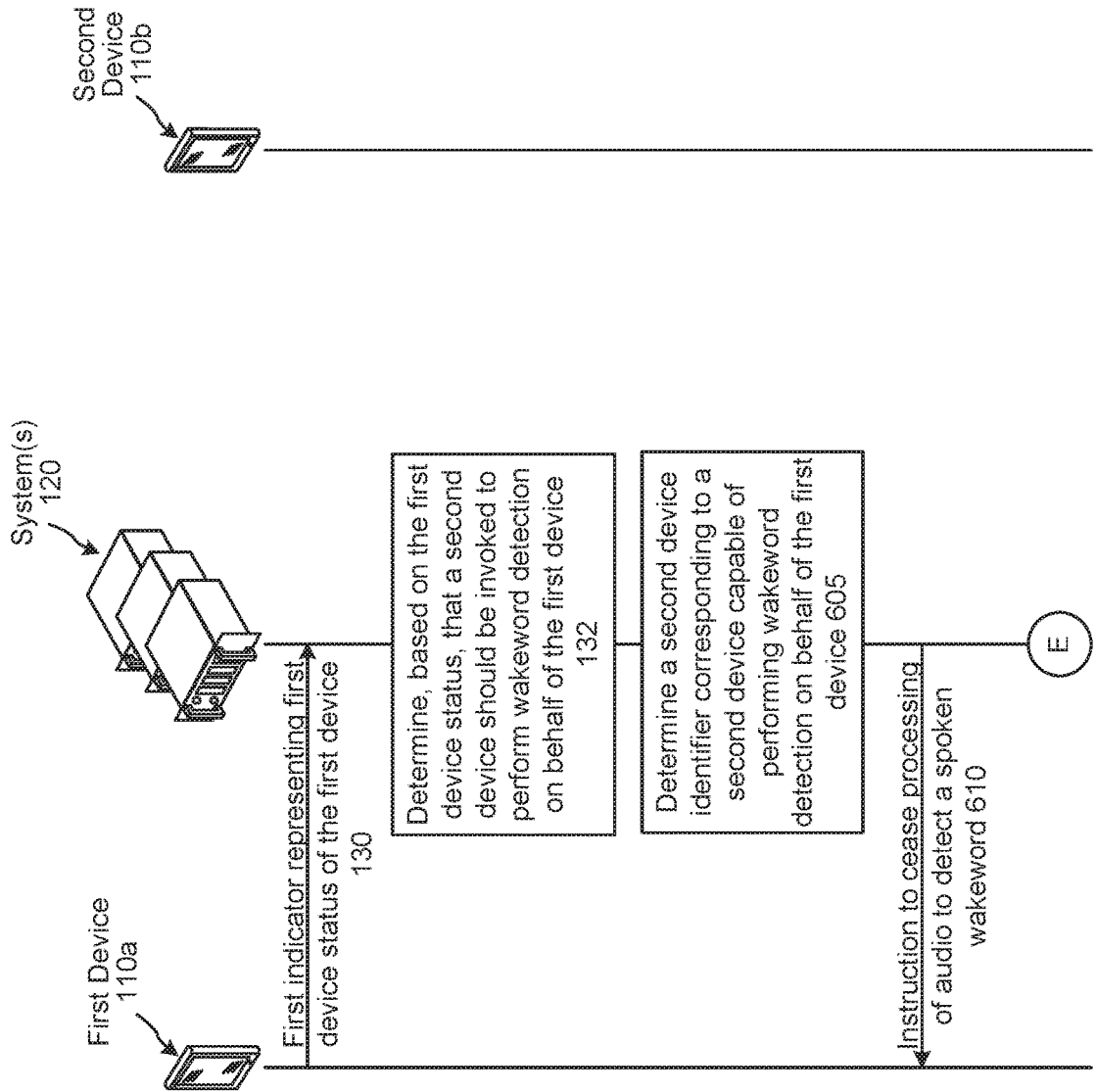

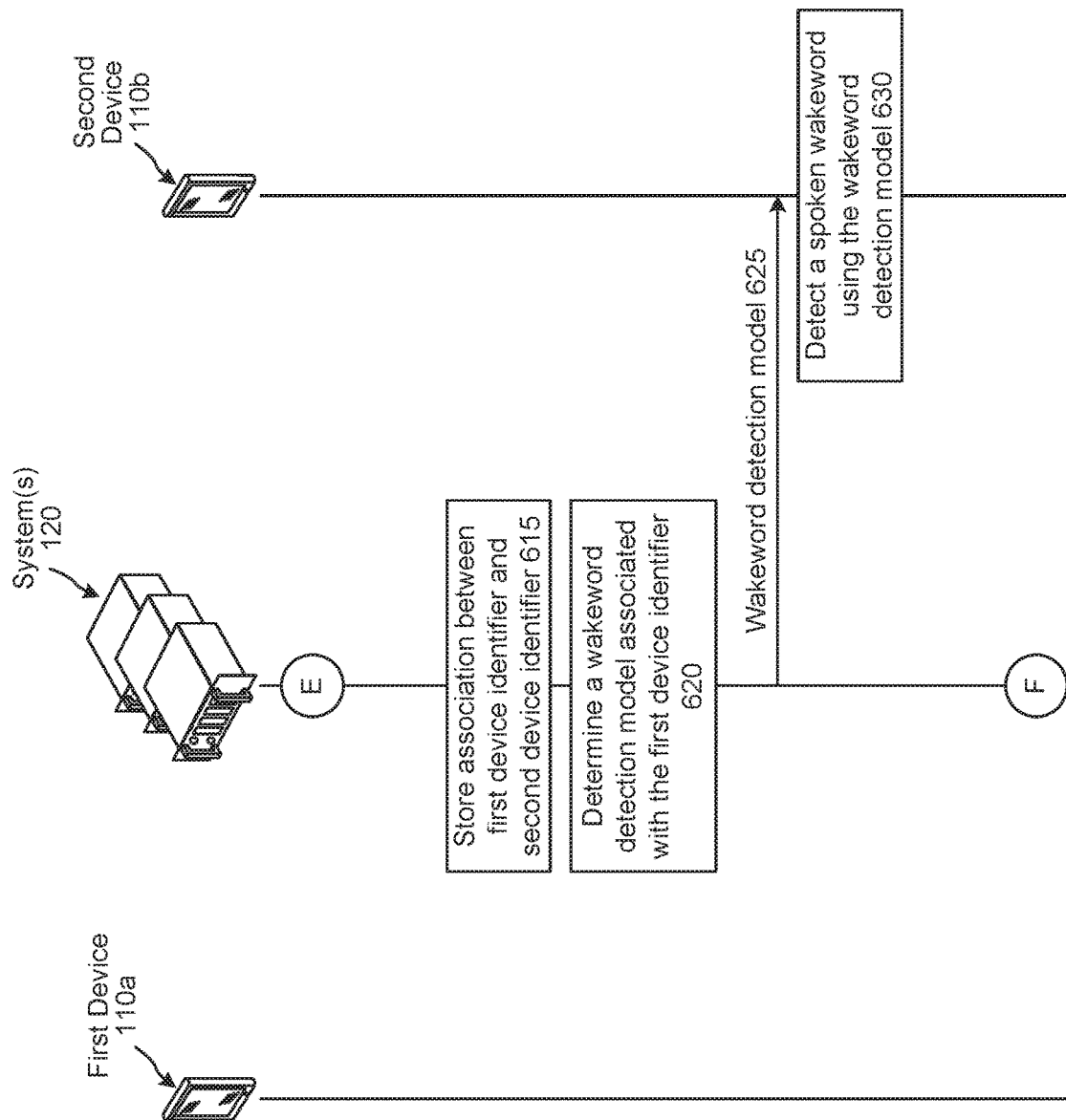

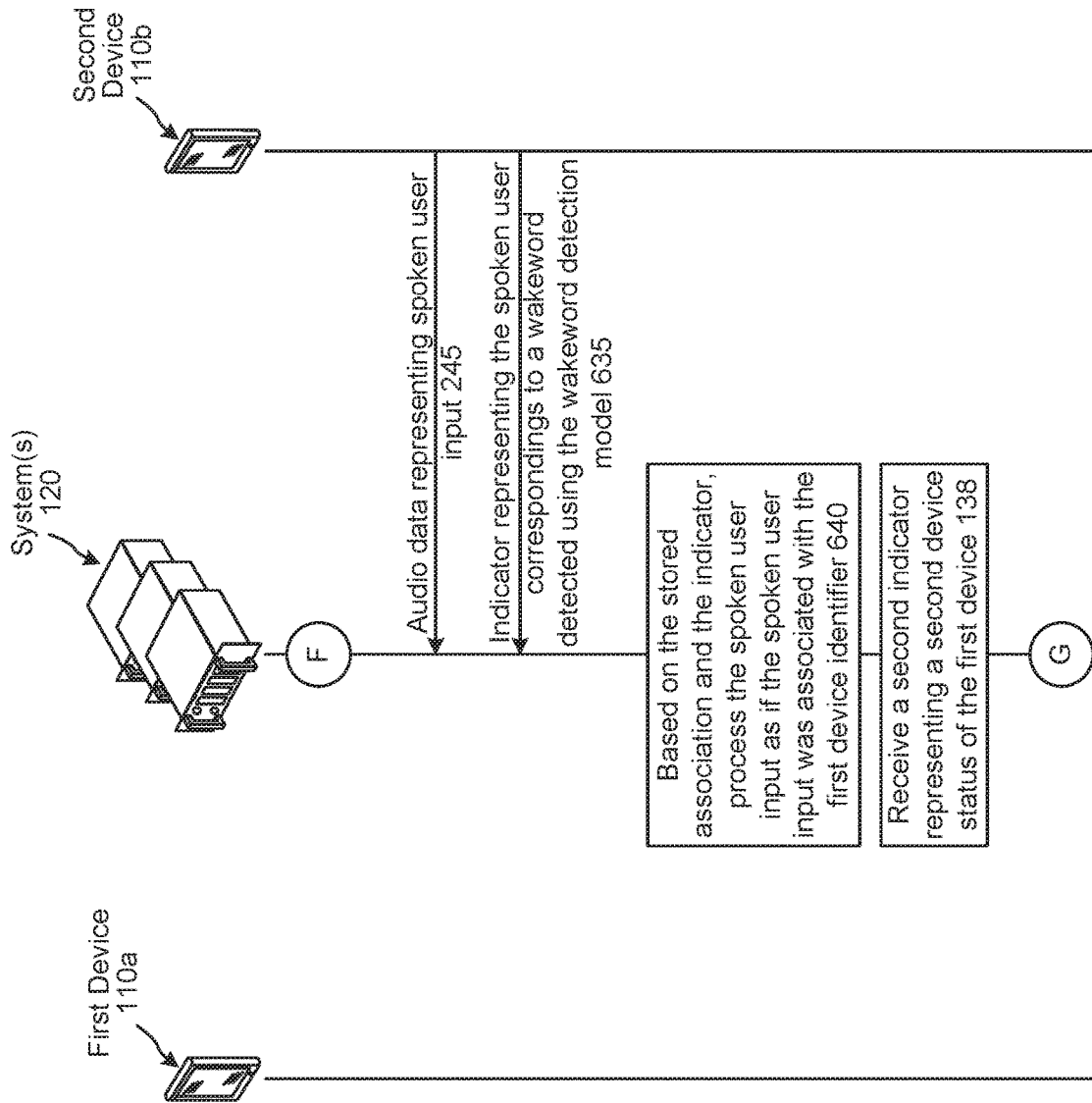

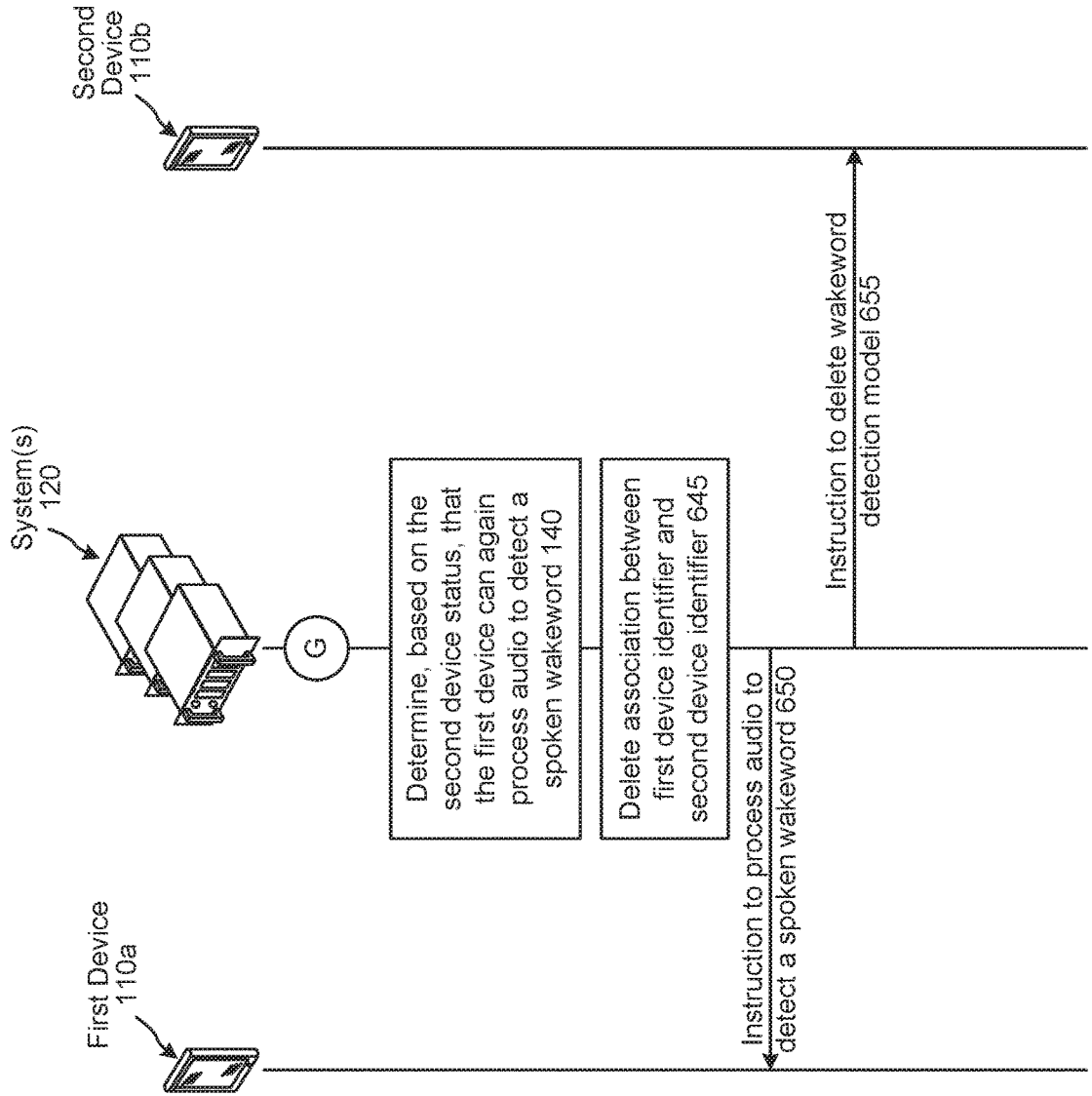

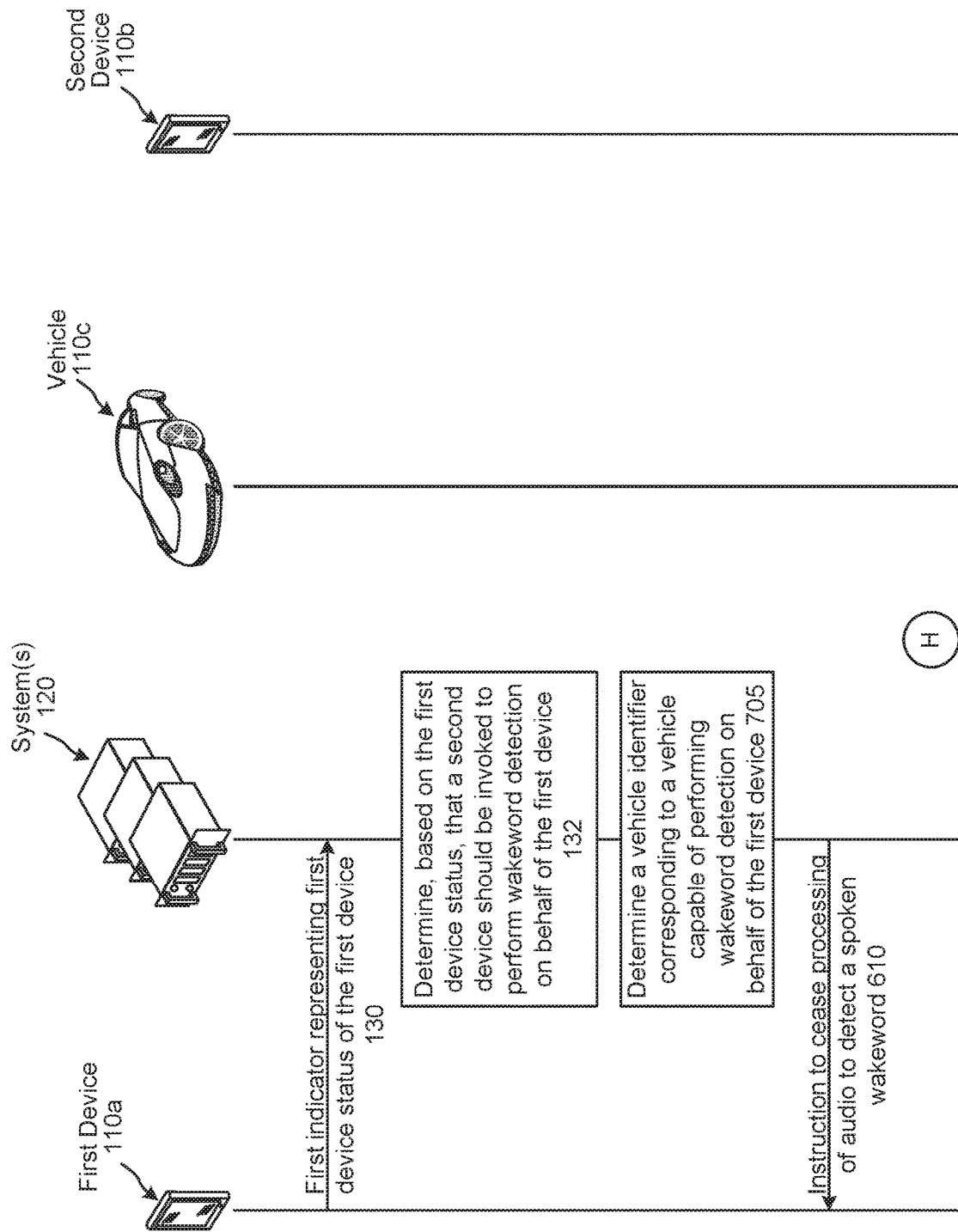

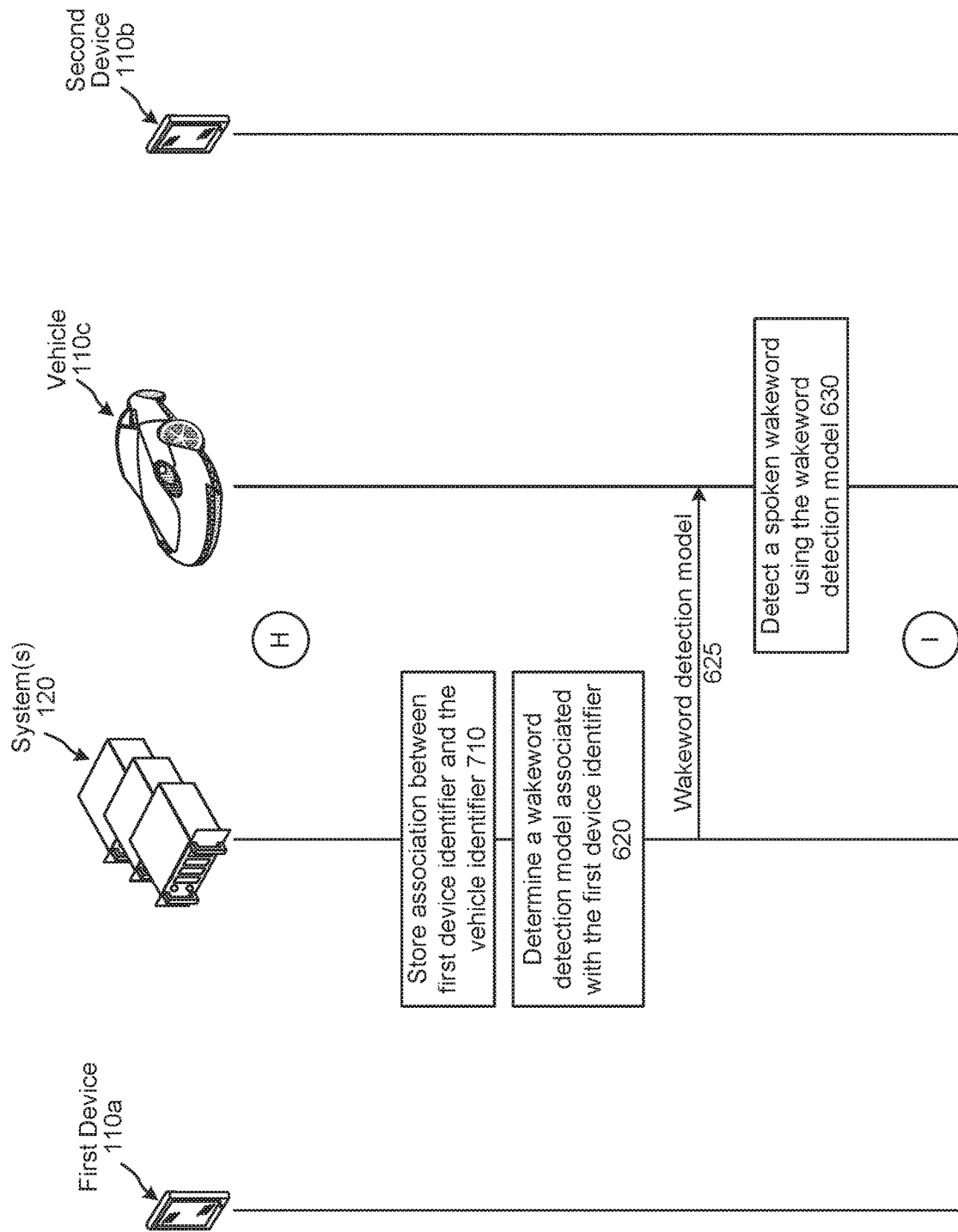

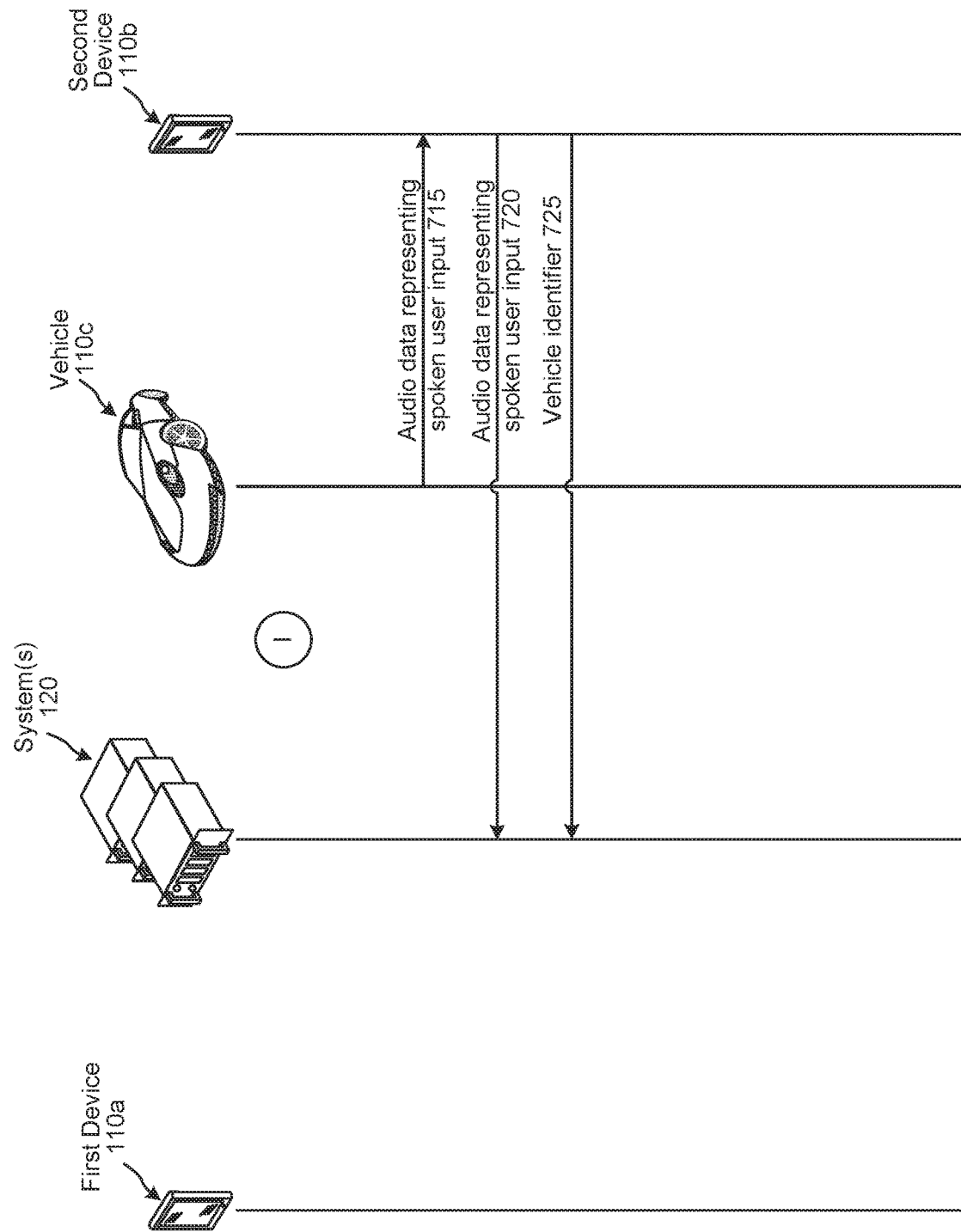

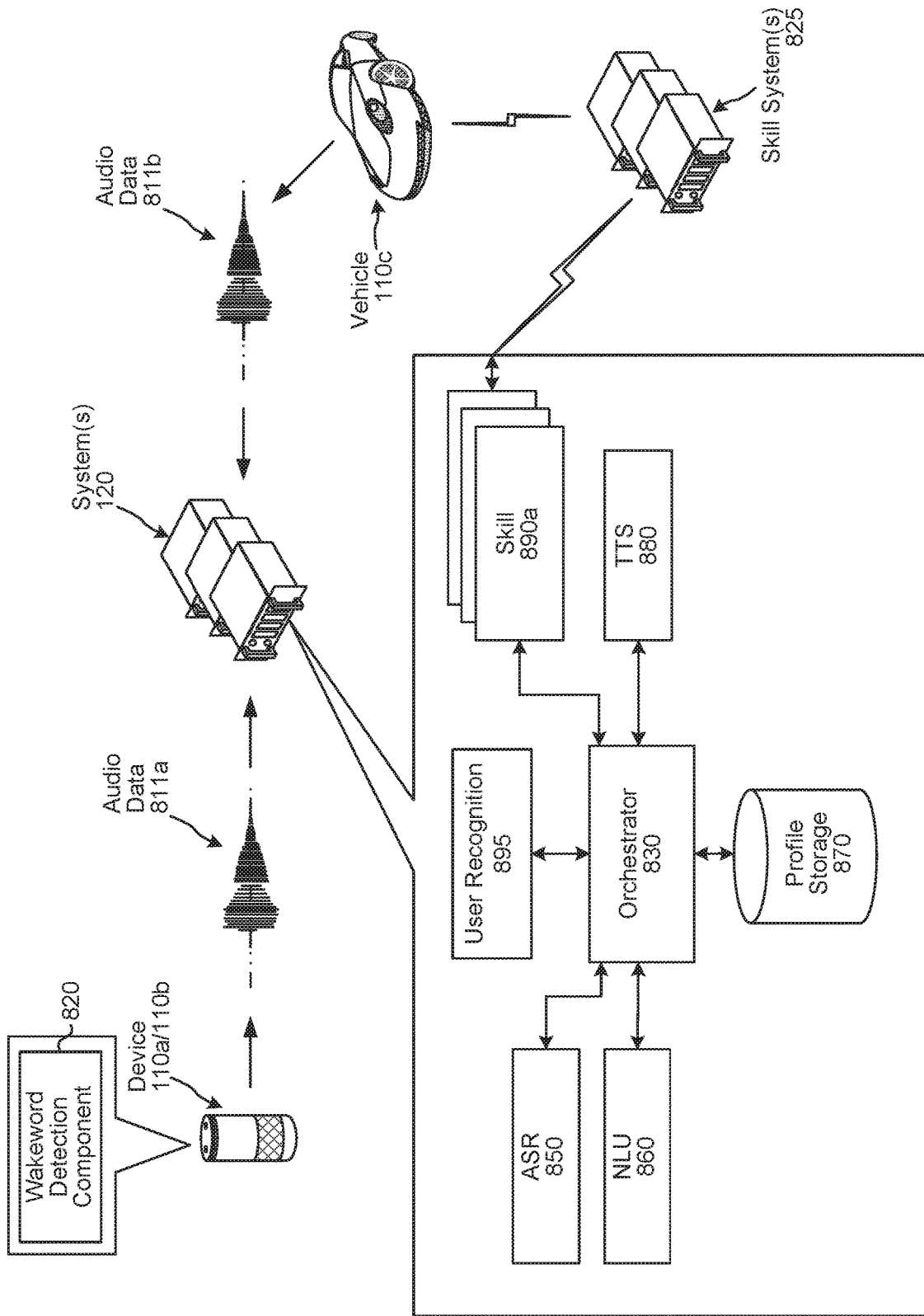

WAKEWORD DETECTION USING A SECONDARY MICROPHONE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to use a second device to capture spoken user inputs when a first device is prevented from capturing spoken user inputs according to embodiments of the present disclosure.

FIGS. 2A and 2B is a signal flow diagram illustrating how a second device, connected to a same vehicle computing system as a first device, may be caused to capture spoken user inputs when the first device can no longer capture spoken user inputs according to embodiments of the present disclosure.

FIGS. 3A and 3B is a signal flow diagram illustrating how a second device, connected to a first device, may be caused to capture spoken user inputs when the first device can no longer capture spoken user inputs according to embodiments of the present disclosure.

FIGS. 4A and 4B is a signal flow diagram illustrating how a second device, not connected to a first device or a vehicle's computing system, may be caused to capture spoken user inputs when the first device can no longer capture spoken user inputs according to embodiments of the present disclosure.

FIGS. 5A and 5B are a signal flow diagram similar to FIGS. 4A and 4B respectfully, where the second device is a vehicle according to embodiments of the present disclosure.

FIGS. 6A through 6D are a signal flow diagram illustrating an example of how a second device may be invoked to perform wakeword detection on behalf of a first device, and subsequently stopped from performing wakeword detection on behalf of the first device, according to embodiments of the present disclosure.

FIGS. 7A through 7C are a signal flow diagram illustrating an example of how second and third devices may be invoked to perform wakeword detection on behalf of a first device according to embodiments of the present disclosure.

FIG. 8 is a conceptual diagram of components of a system according to embodiments of the present disclosure.

DETAILED DESCRIPTION

Figure 9:
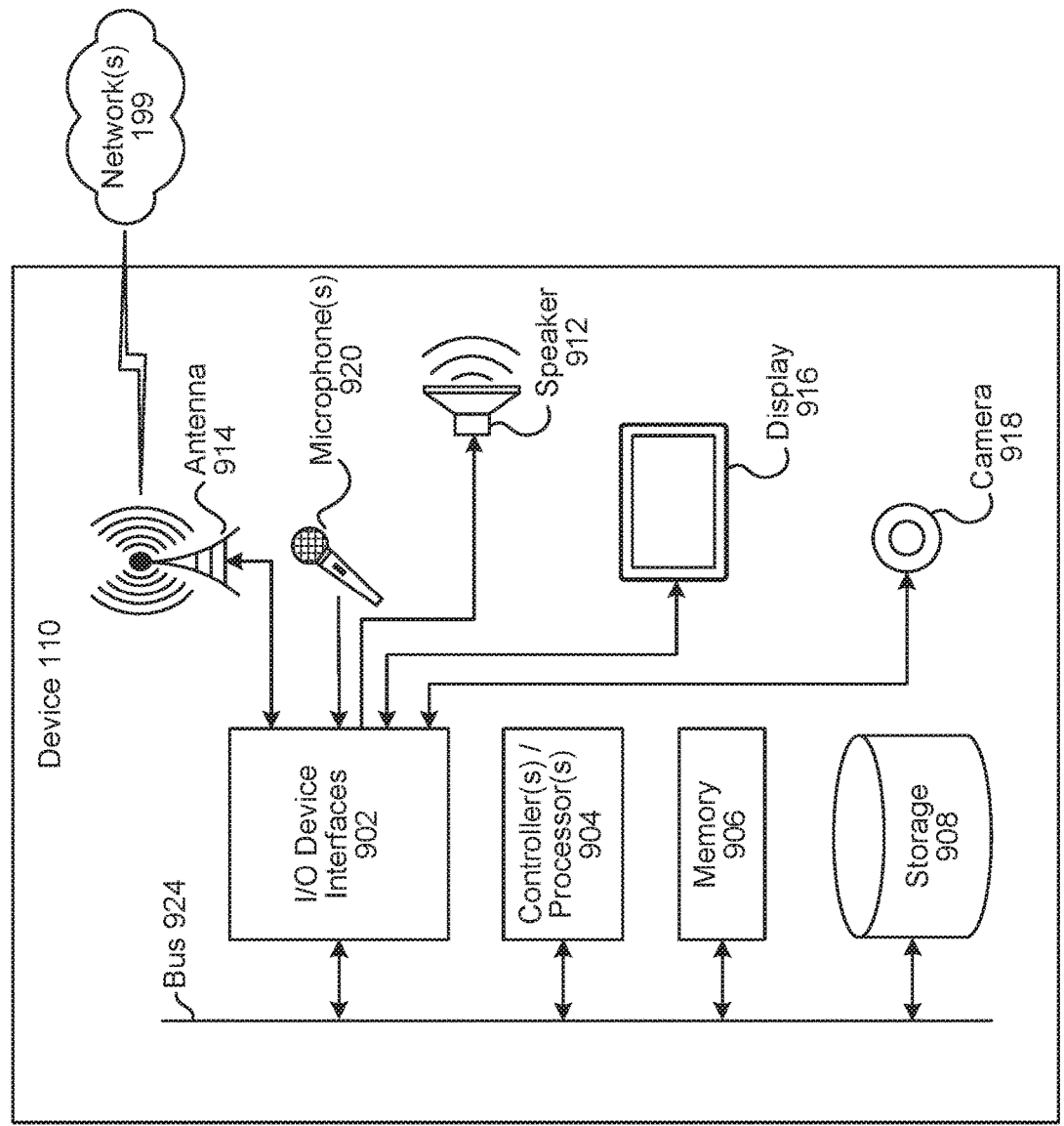
FIG. 9 is a block diagram conceptually illustrating example components of a device according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A system may be configured to perform actions in response to spoken user inputs. For example, for the spoken user input of "Alexa, play Adele music," a system may output music sung by an artist named Adele. For further example, for the spoken user input of "Alexa, turn on the lights," a system may turn on "smart" lights associated with the user's profile.

Various devices may be implemented as part of a system to capture spoken user inputs. For example, a vehicle with a computing system in communication with a speech processing system, a smart phone, tablet, etc. may capture a spoken user input and send data, representing the spoken user input, to a system for speech processing.

A device (e.g., a smart phone) may be connected to a vehicle's computing system via Bluetooth, Zigbee, a physical cable, or some other connection technique. The device may be rendered incapable of capturing spoken user inputs (intended for a speech processing system) while the device is connected to the vehicle's computing system. Such a situation may occur when, for example, a phone call is initiated using the device or the device receives a phone call (e.g., in which case the microphone(s) of the device may be taken over for purposes of conducting the phone call). Such disabling of the device may additionally or alternatively occur when, for example, the device is a mobile phone and a music playing application is engaged (e.g., in which case the music playing application is provided control of the device's microphone(s)). Thus, in certain scenarios audio data from a microphone may be expressly directed to a particular recipient (e.g., the music playing application) rendering the microphone at least temporarily disabled for other purposes (e.g., capturing audio for commands to a speech processing system).

The present disclosure provides techniques for an alternative method for capturing spoken user inputs while a specific device is prevented from capturing such spoken user inputs. Specifically, at least one microphone of at least one second device may be used to capture spoken user inputs until the disabled device is re-enabled for purposes of capturing spoken user inputs.

The second device, for detecting spoken user inputs, may be determined using other connections, for example Bluetooth protocols. As used herein, "Bluetooth," "Bluetooth protocols," "Bluetooth component," or the like refers to a wireless technology standard for exchanging data over relatively short distances using short-wavelength, ultra-high frequency radio waves. The short-wavelength, ultra-high frequency radio waves may be in the 2.400 to 2.485 GHz range.

Both a first device, which for illustration purposes is the device that is disabled for purposes of capturing spoken user inputs, and a second device may be simultaneously connected to a vehicle's computing system via Bluetooth components of the devices, or another connection technique. When the first device is so disabled, the second device may be enabled for the purpose of capturing spoken user inputs. Enabling of the second device for this purpose may occur until the first device is re-enabled to capture spoken user inputs, at which time the second device may be released from capturing spoken user inputs in substitution for the first device. In other words, once the first device is re-enabled to capture spoken user inputs, the second device may revert to processing as it was prior to being caused to capture spoken user inputs on behalf of the first device.

The present techniques have several benefits. For example, using the second device to capture spoken user inputs enables a user to speak user inputs to the system while the user is engaged in another activity, such as a phone call, using the first device. For further example, when the first device is taken over to detect a first wakeword of a first speech processing system, the second device may be used to detect a second wakeword of a second speech processing system. Other benefits will also be realized.

The system may be configured to only control devices as described above if the system has received explicit permission to do so from one or more users authorized to provide such permission. The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system configured to use a second device to capture spoken user inputs when a first device is prevented from capturing spoken user inputs. More specifically, the second device may be caused to process audio to detect a spoken wakeword when the first device is unable to process audio to detect a spoken wakeword.

As illustrated in FIG. 1, a first device 110a, a second device 110b, a vehicle 110c, and one or more systems 120 may be connected across one or more networks 199. As used herein, a "vehicle" may refer to a car, truck, sport utility vehicle (SUV), plane, boat, motorcycle, or the like. Each of the first and second devices 110a/110b may additionally be connected to a computing system of the vehicle 110c, for example via Bluetooth components of the first and second devices 110a/110b, or other connection techniques.

The second device 110b may take on various forms. For example, the second device 110b may be a smart phone, tablet, a device associated with the system(s) 120 and that is placed on or near a dash of the vehicle 110c, a microphone(s) of the vehicle 110c that is specifically dedicated to capturing audio for the purpose of wakeword detection, etc.

The first and second devices 110a/110b may be configured to process audio to detect a spoken wakeword. The first and second devices 110a/110b may be configured to send audio data, representing a spoken user inputs intended for the system(s) 120, to the system(s) 120 when the first and second devices 110a/110b detect a spoken wakeword. For example, the first and second devices 110a/110b may have companion applications installed thereon that enable the first and second devices 110a/110b to communicate with the system(s) 120. An example companion application is the Alexa application that may be installed on smart phones and tablets. In addition, the vehicle 110c may include a computing system configured to communicate data (e.g., representing spoken user inputs) to the system(s) 120 for speech processing.

At some point, the first device 110a may be rendered incapable of processing audio to detect a spoken wakeword. For example, the first device 110a may be configured with a Hands-Free Profile (HFP). A HFP is a Bluetooth profile that allows a vehicle's hands-free functionality to communicate with a mobile device (e.g., smart phone) in the vehicle. In the specific example of FIG. 1, the HFP of the first device 110a may instruct that all microphones of the first device 110a should be dedicated to performing a telephone call when the first device 110a receives an incoming telephone call or is initiating a telephone call. As a result, when the first device 110a receives an incoming telephone call or initiates a telephone call, the system(s) 120 may receive (130) an indicator representing a first device status of the first device 110a. The system(s) 120 may determine (132), based on the first device status, that a second device should be invoked to perform wakeword detection on behalf of the first device 110a. One skilled in the art will appreciate that the foregoing example is merely illustrative, and that there are other scenarios envisioned by this disclosure in which a second device should be invoked to perform wakeword detection on behalf of the first device 110a.

The indicator, received at step 130, may be embodied in various forms. In an example, the first device 110a may have an operating system with a notification functionality that the system(s) 120 can subscribe to. In particular, the system(s) 120 may subscribe to receive audio interruption notifications, which represent when the operating system (OS) is taking over an audio channel (e.g., microphone(s)) of the first device 110a. For example, an audio interruption notification may be generated when the first device 110a receives an incoming call, when a sound recorder application of the first device 110a has been launched, etc.

The audio interruption notification may be issued to a specific application executing on the first device 110a. The first device 110a may have a companion application installed thereon, with the companion application enabling the first device 110a to send audio data (representing spoken user inputs) to the system(s) 120 for processing. An example companion application is the Alexa application that may be installed in smart phones, tablets, and the like.

The companion application may configure the first device 110a to process audio to detect a spoken wakeword (e.g., "Alexa"). If the first device 110a has been disabled from processing audio to detect a spoken wakeword, when the companion application instructs the first device 110a to send audio to the companion application for such processing, the notification functionality of the first device 110a's OS may generate an audio interruption notification. In response, the companion application may send the indicator at step 130 to the system(s) 120. The indicator may include the audio interruption notification or a representation thereof. The indicator may additionally include a device identifier representing the first device 110a, a user identifier representing a user logged in to the companion application, and/or a vehicle identifier representing the vehicle 110c to which the first device 110a is connected.

After determining a second device 110a should be invoked to perform wakeword detection on behalf of the first device 110a, the system(s) 120 may determine (134) a second device 110b capable of processing audio to detect a spoken wakeword. For example, the system(s) 120 may determine (or receive, from the vehicle 110c, an indicator representing) the second device 110b is connected to the vehicle 110c's computing system via a Bluetooth component of the second device 110b, or another connection technique. The system(s) 120 may thereafter cause (136) the second device 110b to process audio (e.g., captured by a microphone(s) of the second device 110b) to detect a spoken wakeword.

In some examples, the first device status of the first device 110a may permit the first device 110a to continue to process audio to detect a spoken wakeword. In such examples, after the system(s) 120 determines the second device 110b is capable of processing audio to detect a spoken wakeword, the system(s) 120 may send an instruction to the first device 110a, with the instruction causing the first device 110a to cease processing audio to detect a spoken wakeword.

While the second device is caused to process audio to detect a spoken wakeword, the system(s) 120 may receive (138) an indicator representing a second device status of the first device 110a. The system(s) 120 may determine (140), based on the second device status, that the first device 110a can again process audio (e.g., captured by a microphone(s) of the first device 110a) to detect a spoken wakeword. The indicator, received at step 138, may be embodied in various forms.

In an example, once the first device 110a is "released" to again process audio to detect a spoken wakeword, a notification functionality, of the first device 110a's OS, may generate an audio interruption notification representing the first device 110a is again permitted to process audio to detect a spoken wakeword. For example, the audio interruption notification may be generated when the first device 110a ceases performing a telephone call. The first device 110a may use the companion application installed thereon to send the audio interruption notification, or data representing the audio interruption notification, to the system(s) 120, along with a device identifier representing the first device 110a and/or a user identifier representing a user logged in to the companion application.

In some examples, the second device status of the first device 110a may indicate the first device 110a can, but not automatically cause the first device 110a to, again to process audio to detect a spoken wakeword. In such examples, after the system(s) 120 determines the first device 110a can again process audio to detect a spoken wakeword, the system(s) 120 may send an instruction to the first device 110a, with the instruction causing the first device 110a to again process audio to detect a spoken wakeword.

After receiving the indicator representing the first device 110a can again process audio to detect a spoken wakeword, the system(s) 120 may cease (142) causing the second device 110b to process audio to detect a spoken wakeword.

In some examples, when the system(s) 120 receives the indicator at step 138, the second device 110b, or the system(s) 120, may be processing with respect to a spoken wakeword or user input received prior to the system(s) 120 receiving the indicator. When this occurs, the system(s) 120 may permit processing of the spoken wakeword or user input to be completed prior to the system(s) 120 ceasing (142) causing the second device to process audio to detect a spoken wakeword.

In some instances, both the first and second devices 110a/110b may be connected to the vehicle 110c's computing system via Bluetooth components of the first and second devices 110a/110b, or another connection technique. Moreover, the vehicle's computing system may be configured to communicate with the system(s) 120. FIGS. 2A and 2B illustrate how a second device 110b, connected to the vehicle 110c's computing system, may be identified and caused to process audio to detect a spoken wakeword when the first device 110a can no longer process audio to detect a spoken wakeword.

The system(s) 120 receives (130) the indicator representing the first device status of the first device 110a, and determines (132), therefrom, that a second device should be invoked to perform wakeword detection on behalf of the first device 110a. The indicator may include a vehicle identifier representing the vehicle 110c to which the first device 110a is connected via a Bluetooth component of the first device 110a, or another connection technique. The system(s) 120 may determine (205) the vehicle identifier represented in the indicator. In an example, the vehicle identifier may be a vehicle identification number (VIN).

The system(s) 120 may send (210), to the vehicle 110c associated with the vehicle identifier, a request for device identifiers representing devices connected to the vehicle 110c's computing system via Bluetooth components or another connection technique. In an example, the system(s) 120 may specifically request the vehicle 110c provide device identifiers of connected devices having HFP Bluetooth profiles. The vehicle 110c may determine (215) the device identifiers and send (220) the device identifiers to the system(s) 120.

The system(s) 120 may determine (225) the second device 110b's identifier (received at step 220) is associated with a profile (e.g., a user profile, group profile, and/or device profile) stored by the system(s) 120. The system(s) 120 may additionally determine the profile includes data representing a user's explicit permission to use the second device 110b to capture spoken user inputs (intended for the system(s) 120) when another device (associated with the same user and/or group profile) is incapable of doing so. The system(s) 120 may thereafter send (230), to the vehicle 110c, an instruction to cause the second device 110b to process audio to detect a spoken wakeword. The instruction may include the second device 110b's device identifier.

The vehicle 110c may send (235), to the second device 110b via a Bluetooth component of the second device 110b, or another connection technique, an instruction to process audio to detect a spoken wakeword and send data representing corresponding spoken user inputs to the system(s) 120 for processing. In response to receiving the instruction, the second device 110b may process (240) audio (e.g., captured by the second device 110b's microphone(s)) to detect a spoken wakeword. When the second device 110b detects the wakeword, the second device 110b may send (245), to the system(s) 120, audio data corresponding to a spoken user input surrounding the spoken wakeword. In an example, the second device 110b may send the audio data to the vehicle 110c and the vehicle 110c may send the audio data to the system(s) 120. In another example, the second device 110b may send the audio data to the vehicle 110c, the vehicle 110c may send the audio data to the first device 110a, and the first device 110a may send the audio data to the system(s) 120. In another example, the second device 110b may send the audio data to the first device 110a and the first device 110a may send the audio data to the system(s) 120. In another example, the second device 110b may send the audio data to the system(s) 120, for example using a companion application installed on the second device 110*b*.

While the second device 110*b* is caused process audio to detect a spoken wakeword, the system(s) 120 may process audio data, representing spoken user inputs originating from the second device 110*b*, as if the audio data originated from the first device 110*a*. In other words, the system(s) 120 may associate the second device 110*b* with the first device 110*a* such that spoken user inputs, captured by the second device 110*b*, are processed by the system(s) 120 as if the spoken user inputs were captured by the first device 110*a*. This may be achieved in various manners. In an example, after the system(s) 120 determines the second device 110*b* is to perform wakeword detection on behalf of the first device 110*a*, the system(s) 120 may generate an indicator (e.g., a flag) representing the second device 110*b* is performing wakeword detection and capturing spoken user inputs on the first device 110*a*'s behalf. The system(s) 120 may associate the indicator with the second device 110*b*'s profile. As long as the indicator is associated with the second device 110*b*'s identifier, the system(s) 120 may perform speech processing on audio data, representing spoken user inputs, originating from the second device 110*b* as if the audio data originated from the first device 110*a*. Once the first device 110*a* is again able to perform wakeword detection and capture spoken user inputs, the system(s) 120 may unassociated the indicator from the second device 110*b*'s profile, at which time spoken user inputs captured by the second device 110*b* may be treated as if the spoken user inputs were, in fact, captured by the second device 110*b*, and not the first device 110*a*.

The second device 110*b* may be configured to require user permission prior to the second device 110*b* processing audio in response to receiving the instruction at step 235. The second device 110*b* may include a graphical user interface (GUI) through which such permission may be received. In an example, the instruction, received by the second device 110*b* at step 235, may include a portion that causes the OS of the second device 110*b* to generate a push notification for display via the second device 110*b*'s GUI. The push notification may request a user input permitting the second device 110*b* to process audio at step 240. For example, the push notification may request the user select a virtual button on the GUI, speak an input representing the requested permission, provide a passcode, etc. In response to receiving the user's indication of consent, the second device 110*b* may begin processing audio to detect a wakeword at step 240.

There may be situations where the first and second devices 110*a*/110*b* are connected together via Bluetooth components thereof, or some other connection technique. FIGS. 3A and 3B illustrate how a second device 110*b*, connected to the first device 110*a*, may be identified and caused to process audio to detect a spoken wakeword when the first device 110*a* can no longer process audio to detect a spoken wakeword.

The system(s) 120 receives (130) the indicator representing the first device status of the first device 110*a*, and determines (132), therefrom, that a second device should be invoked to perform wakeword detection on behalf of the first device 110*a*. The system(s) 120 may send (305), to the first device 110*a*, a request for device identifiers representing devices connected to the first device 110*a* via Bluetooth components or another connection technique. The first device 110*a* may determine (310) the device identifiers and send (315) the device identifiers to the system(s) 120.

The system(s) 120 may determine (225) the second device 110*b*'s identifier (received at step 315) is associated with a profile (e.g., a user profile, group profile, and/or device profile) stored by the system(s) 120. The system(s) 120 may additionally determine the profile includes data representing a user's explicit permission to use the second device 110*b* to capture spoken user inputs (intended for the system(s) 120 when another device (associated with the same user and/or group profile) is incapable of doing so. The system(s) 120 may thereafter send (320), to the first device 110*a*, an instruction to cause the second device 110*b* to process audio to detect a spoken wakeword. The instruction may include the second device 110*b*'s device identifier.

The first device 110*a* may send (325), to the second device 110*b* via Bluetooth protocols or another connection technique, an instruction to process audio to detect a spoken wakeword and send data representing corresponding spoken user inputs to the system(s) 120 for processing. In response to receiving the instruction, the second device 110*b* may process (240) audio (e.g., captured by the second device 110*b*'s microphone(s)) to detect a spoken wakeword. When the second device 110*b* detects the wakeword, the second device 110*b* may send (245), to the system(s) 120, audio data corresponding to a spoken user input surrounding the spoken wakeword. In an example, the second device 110*b* may send the audio data to the first device 110*a* and the first device 110*a* may send the audio data to the system(s) 120. In another example, the second device 110*b* may send the audio data to the system(s) 120, for example using a companion application installed on the second device 110*b*.

There may be situations where the second device 110*b* is not connected, via Bluetooth protocols or another connection technique, to either the first device 110*a* or the vehicle 110*c*'s computing system. FIGS. 4A and 4B illustrate how a second device 110*b*, not connected to the first device 110*a* or the vehicle 110*c*'s computing system, may be identified and caused to process audio to detect a spoken wakeword when the first device 110*a* can no longer process audio to detect a spoken wakeword.

The system(s) 120 receives (130) the indicator representing the first device status of the first device 110*a*, and determines (132), therefrom, that a second device should be invoked to perform wakeword detection on behalf of the first device 110*a*. The system(s) 120 determines (405) one or more device identifiers associated with a same user profile/group profile as a first device identifier corresponding to the first device 110*a*. The one or more device identifiers may include the second device 110*b*'s identifier.

The system(s) 120 may determine (410) the second device 110*b*'s identifier is associated with similar position information as the first device 110*a*'s identifier. For example, the system(s) 120 may determine the second device 110*b*'s identifier is associated with the same or similar global positioning system (GPS) coordinates as the first device 110*a*'s identifier. For further example, the system(s) 120 may determine the second device 110*b*'s identifier is associated with same network information as the first device 110*a*'s identifier (e.g., the first and second device 110*a*/110*b* identifiers are both associated with Wi-Fi network information representing a Wi-Fi network generated by the vehicle 110*c*). Other examples are possible.

As described above, the system(s) 120 may determine the second device 110*b* based on the second device 110*b*'s identifier being associated with similar position information as the first device 110*a*'s identifier in a group profile. In another example, the system(s) 120 may determine the second device 110*b* should be invoked to perform wakeword detection based on information stored by a component of the system(s) 120 that maintains a record of device statuses and metadata regarding location of devices.

For example, the first device 110*a* and the second device 110*b* may detect the same spoken wakeword and, as a result, the component of the system(s) 120 may associate the first device 110*a*'a identifier and the second device 110*b*'s identifier in a group of devices. For further example, the first device 110*a* may send first data to the component, with the first data representing the first device 110*a* is connected to the second device 110*b*, the vehicle 110*c*, or another device 110 using Bluetooth protocols. The second device 110*b* may send second data to the component, with the second data representing the second device 110*b* is connected to the first device 110*a*, the vehicle 110*c*, or another device 110 using Bluetooth protocols. Based on the first device 110*a* and the second device 110*b* being connected to each other or the same other device 110, the component of the system(s) 120 may associate the first device 110*a*'s identifier and the second device 110*b*'s identifier in a group of devices. The system(s) 120 may determine the second device identifier at step 410 by querying the aforementioned component of the system(s) 120 for device identifiers represented in a same group as the first device 110*a*'s identifier.

The system(s) 120 may send (415), to the second device 110*b*, an instruction to process audio to detect a spoken wakeword and send data representing corresponding spoken user inputs to the system(s) 120 for processing. In response to receiving the instruction, the second device 110*b* may process (240) audio (e.g., captured by the second device 110*b*'s microphone(s)) to detect a spoken wakeword. When the second device 110*b* detects the wakeword, the second device 110*b* may send (245), to the system(s) 120, audio data corresponding to a spoken user input surrounding the spoken wakeword. In an example, the second device 110*b* may send the audio data to the system(s) 120, for example using a companion application installed on the second device 110*b*.

As illustrated in FIGS. 5A and 5B, the second device discussed above in reference to FIGS. 4A and 4B may itself be the vehicle 110*c*. In such a scenario, the system(s) 120 receives (130) the indicator representing the first device status of the first device 110*a*, and determine (132), therefrom, that a second device should be invoked to perform wakeword detection on behalf of the first device 110*a*. The system(s) 120 determines (405) one or more device identifiers associated with a same user profile/group profile as a first device identifier corresponding to the first device 110*a*. The one or more device identifiers may include the vehicle 110*c*'s identifier.

The system(s) 120 may determine (410) the vehicle 110*c*'s identifier is associated with similar position information as the first device 110*a*'s identifier. For example, the system(s) 120 may determine the vehicle 110*c*'s identifier is associated with the same or similar global positioning system (GPS) coordinates as the first device 110*a*'s identifier. For further example, the system(s) 120 may determine the vehicle 110*c*'s identifier is associated with same network information as the first device 110*a*'s identifier (e.g., the first device 110*a*'s identifier is associated with Wi-Fi network information representing a Wi-Fi network generated by the vehicle 110*c*). Other examples are possible.

The system(s) 120 may send (415), to the vehicle 110*c*, an instruction to process audio to detect a spoken wakeword and send data representing corresponding spoken user inputs to the system(s) 120 for processing. In response to receiving the instruction, the vehicle 110*c* may process (240) audio (e.g., captured by the vehicle 110*c*'s microphone(s)) to detect a spoken wakeword. When the vehicle 110*c* detects the wakeword, the vehicle 110*c* may send (245), to the system(s) 120, audio data corresponding to a spoken user input surrounding the spoken wakeword.

While it has been described, with respect to FIGS. 5A and 5B, that the signal at step 130 represents the first device 110*a* cannot perform wakeword detection, one skilled in the art will appreciate that the first device 110*a* and the vehicle 110*c* may be swapped with respect to FIGS. 5A and 5B. That is, the indicator at step 130 may represent the vehicle 110*c* cannot perform wakeword detection and the first device 110*a* may be caused to perform wakeword detection on the vehicle 110*c*'s behalf.

It will also be appreciated that the vehicle 110*c* (or other devices 110 represented in and envisioned by FIG. 11) may be substituted for the first device 110*a* and/or the second device 110*b* in FIGS. provided herein.

Described above are situations in which a second device 110*b* is caused to process audio to detect a spoken wakeword when a first device 110*a* can no longer process audio to detect a spoken wakeword. In some examples, there may be more than the second device 110*b* that may be caused to process audio to detect a spoken wakeword. For example, a third device may be caused to process audio to detect a spoken wakeword.

The system(s) 120 may select which device (e.g., of the second device 110*b* or the third device) to cause to process audio to detect a spoken wakeword. For example, the system(s) 120 may determine a signal strength of each device and select the device associated with the greatest signal strength. For further example, the system(s) 120 may determine speeds at which the devices can send data to the system(s) 120 and select the device that is capable of sending data to the system(s) 120 the quickest.

The system(s) 120 may alternatively cause more than one device to process audio to detect a spoken wakeword (and send audio data representing corresponding spoken user inputs to the system(s) 120) when the first device 110*a* is unable to do so. For example, the system(s) 120 may determine the second device 110*b* and a third device are connected to the vehicle 110*c*'s computing system, may determine the second device 110*b* and a third device are connected to the first device 110*a*, may determine the second device 110*b* and a third device are associated with a same user/group profile as the first device 110*a* as well as have similar position information as the first device 110*a*, etc. When this occurs, the system(s) 120 may cause the second device 110*b* and the third device to process audio to detect a spoken wakeword (and send audio data representing corresponding spoken user inputs to the system(s) 120). While it has been described that two devices may be caused to process audio to detect a spoken wakeword (and send audio data representing corresponding spoken user inputs to the system(s) 120) when the first device 110*a* can no longer do so, one skilled in the art will appreciate that more than two devices may be caused to process audio to detect a spoken wakeword (and send audio data representing corresponding spoken user inputs to the system(s) 120).

When two or more devices are caused to process audio to detect a spoken wakeword (and send audio data representing corresponding spoken user inputs to the system(s) 120), the system(s) 120 may use audio data, received from one of the devices, to cancel noise present in audio data received from the other device. Such noise canceling may be performed using techniques known in the art as well as techniques not yet invented.

As described above, the first device 110*a* may be prevented from performing wakeword detection in response to a present device status. In other examples, the first device 110a may be permitted to continue performing wakeword detection when the device corresponds to a particular device status. For example, the first device 110a may be configured to continue to perform wakeword detection when the device is performing a call (e.g., a Voice over Internet Protocol (VoIP) call) with another device. Such may be result in the first device 110a capturing a user input corresponding to spoken wakeword; sending, to the system(s) 120, audio data representing the user input; receiving, from the system(s) 120, audio data representing a response to the user input; and the first device 110a outputting the audio data using a microphone that audio of the call is also output through. This may be an undesirable user experience.

FIGS. 6A through 6D illustrate processing that may be performed to cause the second device 110b to perform wakeword detection on behalf of the first device 110a in the foregoing situation, as well as processing to stop the second device 110b from performing wakeword detection on behalf of the first device 110a. The system(s) 120 receives (130) the indicator representing the first device status of the first device 110a, and determines (132), therefrom, that a second device should be invoked to perform wakeword detection on behalf of the first device 110a. For example, the indicator, received at step 130, may represent the first device 110a is performing a VoIP call.

The system(s) 120 may determine (605) a second device identifier corresponding to a second device 110b capable of performing wakeword detection on behalf of the first device 110a. Such a decision may be premised on various determinations and signals. For example, the system(s) 120 may query the first device 110a for device identifiers representing devices connected to the first device 110a via Bluetooth protocols or some other wireless technology. And in response to such query, the system(s) 120 may receive the second device identifier. For further example, the system(s) 120 may determine the second device identifier is associated with a same profile as the first device identifier, and determine the first device identifier is associated with similar or identical position information as the second device identifier (e.g., as associated with similar or identical GPS coordinates, are connected to the same wireless network as represented by the first and second device identifiers being associated with the same wireless network information, etc.). In another example, the system(s) 120 may query a component thereof for related device identifier, where the component maintains a record of device statuses and metadata regarding location of devices, and groups of related device identifier (e.g., corresponding to devices that detected the same spoken wakeword). Other examples are possible. In at least some examples, the second device 110b may already be performing wakeword detection on its own, regardless of first device 110a processing.

After determining the second device identifier, the system(s) 120 may send (610), to the first device 110a, an instruction to cease processing of audio to detect a spoken wakeword (e.g., to cease performing wakeword detection).

After determining the second device identifier, the system(s) 120 may store (615) an association between the first device identifier and the second device identifier. The association may represent that the second device 110b, corresponding to the second device identifier, will be performing wakeword detection on behalf of the first device 110a as long as the association is maintained.

The system(s) 120 may store one or more wakeword detection models. A wakeword detection model may enable a device 110 implementing the model to detect a particular wakeword without respect to any particular user's speech (e.g., the model may have been trained using speech of various users of the system(s) 120). A wakeword detection model may, in some instances, enable a device 110 implementing the model to detect a particular wakeword as spoken by a particular user (e.g., the model may have been trained using speech of a particular user of the system(s) 120). Hybrid wakeword detection models are also possible. As used herein, a "hybrid wakeword detection model" refers to a wakeword detection model including a portion trained with respect to speech of various users of the system(s) 120, as well as a portion trained with respect to a particular user of the system(s) 120. Each wakeword detection model may be associated with a different user identifier and/or device identifier.

The system(s) 120 may determine (620) a wakeword detection model associated with the first device identifier. The system(s) 120 may send (625) the wakeword detection model to the second device 110b corresponding to the second device identifier. Such may enable the second device 110b to detect a wakeword represented in audio spoken by a user of the first device 110a.

The second device 110b may process audio using the received wakeword detection model as well as one or more wakeword detection models that were previously stored on the second device 110b. For example, the second device 110b may have previously stored a wakeword detection model specific to a user of the second device 110b. After receiving the wakeword detection model at step 625, the second device 110b may detect wakewords using the received and previously stored wakeword detection models, which enables the second device 110b to detect and distinguish between wakewords spoken by the user of the first device 110a as well as the user of the second device 110b.

When the second device 110b detects a spoken wakeword, the second device 110b may send an indicator, of the wakeword detection model used to detect the wakeword, to the system(s) 120. To that end, when the second device 110b detects (630) a spoken wakeword using the wakeword detection model received at step 625, the second device 110b may send (245), to the system(s) 120, audio data representing the spoken user input, and may also send (635), to the system(s) 120, an indicator representing the spoken user input corresponds to a wakeword detected using the wakeword detection model received at step 625.

Based on the association stored at step 615, and the indicator received at step 635, the system(s) 120 may process (640) the spoken user input as if the spoken user input was associated with the first device identifier (and/or a user identifier corresponding to the wakeword detection model). For example, the system(s) 120 may process the spoken user input using a first speech processing component associated with the first device 110a's identifier, instead of using a second speech processing component associated with the second device 110b's identifier. The first speech processing component may be an NLU component, a user profile, or some other component specifically associated with the first device 110a's identifier.

Sometime after or while processing the spoken user input, the system(s) 120 may receive (138) an indicator representing a second device status of the first device. The system(s) 120 may determine (140), based on the second device status, that the first device 110a may again process audio to detect a spoken wakeword. For example, the second device status may represent the first device 110a is no longer performing a VoIP call.

In response to determining the first device 110a may again process audio to detect a spoken wakeword, the system(s)

120 may perform several actions. The system(s) 120 may delete (645) the association, previously stored at step 615, between the first device identifier and the second device identifier. Additionally or alternatively, the system(s) 120 may send (650), to the first device 110*a*, an instruction to again process audio to detect a spoken wakeword. This instruction may effectively re-enable the first device 110*a*'s wakeword detection functionality. The system(s) 120 may additionally or alternatively send (655), to the second device 110*b*, an instruction to delete the wakeword detection model previously received at step 625. Such instruction may disable the second device 110*b*'s ability to perform wakeword detection with respect to speech of a user of the first device 110*a*. Yet, the instruction to the second device 110*b* may not affect the second device 110*b*'s ability to continue to perform wakeword detection with respect to speech of a user of the first device 110*a*, if the first device 110*a* previously included a wakeword detection model that permitted such processing.

FIGS. 7A through 7C illustrate processing that may be performed to cause a vehicle 110*c* and the second device 110*b* to perform wakeword detection on behalf of the first device 110*a*. While a vehicle 110*c* is explicitly illustrated and described, one skilled in the art will appreciate that the vehicle 110*c* may be replaced with another device 110 without departing from the present disclosure.

The system(s) 120 receives (130) the indicator representing the first device status of the first device 110*a*, and determines (132), therefrom, that a second device should be invoked to perform wakeword detection on behalf of the first device 110*a*.

The system(s) 120 may determine (705) a vehicle identifier corresponding to a vehicle 110*c* capable of performing wakeword detection on behalf of the first device 110*a*. Such a decision may be premised on various determinations and signals as described herein.

After determining the vehicle identifier, the system(s) 120 may send (610), to the first device 110*a*, an instruction to cease processing of audio to detect a spoken wakeword (e.g., to cease performing wakeword detection).

After determining the vehicle identifier, the system(s) 120 may store (710) an association between the first device identifier and the vehicle identifier. The association may represent that the vehicle 110*c*, corresponding to the vehicle identifier, will be performing wakeword detection on behalf of the first device 110*a* as long as the association is maintained.

The system(s) 120 may determine (620) a wakeword detection model associated with the first device identifier. The system(s) 120 may send (625) the wakeword detection model to the vehicle 110*c* corresponding to the vehicle identifier. Such may enable the vehicle 110*c* to detect a wakeword represented in audio spoken by a user of the first device 110*a*.

The vehicle 110*c* may process audio using the received wakeword detection model. However, the vehicle 110*c* may, in some examples, be unable to send audio data, representing a spoken user input, to the system(s) 120 for processing. Nonetheless, as described above, a second device 110*b* may be connected to the vehicle 110*c* via a Bluetooth protocol or some other connection technique. The second device 110*b* may be capable of sending audio data, representing a spoken user input, to the system(s) 120 for processing. In an example, the second device 110*b* may send the audio data to the system(s) 120 via a companion application installed on the device.

Accordingly, when the vehicle device 110*b* detects (630) a spoken wakeword using the wakeword detection model received at step 625, the vehicle 110*c* may send (715) audio data, representing a spoken user input corresponding to the detected wakeword, to the second device 110*b*. The second device 110*b* may send (720), to the system(s) 120, the audio data. The second device 110*b* may also send (725), to the system(s) 120, the vehicle's identifier.

Based on the association stored at step 710, and the vehicle identifier received at step 725, the system(s) 120 may process the spoken user input as if the spoken user input was associated with the first device identifier (and/or a user identifier corresponding to the wakeword detection model).

The overall system of the present disclosure may operate using various components as illustrated in FIG. 8. The various components may be located on same or different physical devices. Communication between various components may occur directly or across a network(s) 199.

An audio capture component(s), such as a microphone or array of microphones of a device 110, captures audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may use a wakeword detection component 820 to perform wakeword detection to determine when a user intends to speak an input to the system(s) 120. An example wakeword is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data to determine if the audio data "matches" stored audio data corresponding to a wakeword.

Thus, the wakeword detection component 820 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 811 to the system(s) 120. The audio data 811 may include data corresponding to the wakeword, or the device 110 may remove the portion of the audio data 811 corresponding to the wakeword prior to sending the audio data 811 to the system(s) 120.

An orchestrator component 830 may receive the audio data 811. The orchestrator component 830 may include memory and logic that enables the orchestrator component 830 to transmit various pieces and forms of data to various components of the overall system of the present disclosure, as well as perform other operations.

The orchestrator component 830 sends the audio data 811 to an ASR component 850. The ASR component 850 transcribes the audio data 811 into text data. The text data output by the ASR component 850 represents one or more than one (e.g., in the form of an n-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., subword units, such as phonemes, etc.) and sequences of sounds to identify words that match the sequence of sounds of the speech represented in the audio data 811. The ASR component 850 outputs text data representing one or more ASR hypotheses. The text data output by the ASR component 850 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The NLU component 860 attempts to make a semantic interpretation of the one or more ASR hypotheses input therein. That is, the NLU component 860 determines one or more meanings associated with the phrase(s) or statement(s) represented in the text data based on words represented in the text data. The NLU component 860 determines an intent representing an action that a user desires be performed as well as pieces of the text data that allow a device (e.g., a device 110, the system(s) 120, a skill 890, a skill system(s) 825, etc.) to execute the intent. For example, if the text data corresponds to "play Adele music," the NLU component 860 may determine an intent that the system(s) 120 output music and may identify "Adele" as an artist. For further example, if the text data corresponds to "what is the weather," the NLU component 860 may determine an intent that the system(s) 120 output weather information associated with a geographic position of the device 110. The NLU component 860 may output NLU results data (which may include tagged text data, indicators of intent, etc.).

The system(s) 120 may include one or more skills 890. A "skill" may be software running on the system(s) 120 that is akin to a software application running on a traditional computing device. That is, a skill 890 may enable the system(s) 120 to execute specific functionality in order to provide data or produce some other requested output. The system(s) 120 may be configured with more than one skill 890. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 890 may operate in conjunction between the system(s) 120 and other devices, such as the device 110, in order to complete certain functions. Inputs to a skill 890 may come from speech processing interactions or through other interactions or input sources. A skill 890 may include hardware, software, firmware, or the like that may be dedicated to a particular skill 890 or shared among different skills 890.

In addition or alternatively to being implemented by the system(s) 120, a skill 890 may be implemented by a skill system(s) 825. Such may enable a skill system(s) 825 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 890 dedicated to interacting with more than one skill system 825.

Unless expressly stated otherwise, reference to a skill, skill device, skill component, or the like herein may include a skill 890 operated by the system(s) 120 and/or skill operated by the skill system(s) 825. Moreover, the functionality described herein as a skill may be referred to using many different terms, such as an action, bot, app, or the like.

In an example, the system(s) 120 may send data to, and receive data from, the vehicle 110c via a skill system(s) 825. Such a skill system(s) 825 may correspond to a system of a vehicle manufacturer or the like that is configured to communicate with a computing system of the vehicle 110c.

The system(s) 120 may include a TTS component 880. The TTS component 880 may generate audio data (e.g., synthesized speech) from text data using one or more different methods. Text data input to the TTS component 880 may come from a skill 890, the orchestrator component 830, or another component of the system(s) 120.

In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to create audio data including an artificial speech waveform. Parametric synthesis uses a computerized voice generator, sometimes called a vocoder.

The system(s) 120 may include a user recognition component 895 that recognizes one or more users associated with data input to the system(s) 120. The user recognition component 895 may take as input the audio data 811. The user recognition component 895 may perform user recognition by comparing speech characteristics in the audio data 811 to stored speech characteristics of users. The user recognition component 895 may additionally or alternatively perform user recognition by comparing biometric data (e.g., fingerprint data, iris data, etc.), received by the system(s) 120 in correlation with a user input, to stored biometric data of users. The user recognition component 895 may additionally or alternatively perform user recognition by comparing image data (e.g., including a representation of at least a feature of a user), received by the system(s) 120 in correlation with a user input, with stored image data including representations of features of different users. The user recognition component 895 may perform other or additional user recognition processes, including those known in the art. For a particular user input, the user recognition component 895 may perform processing with respect to stored data of users associated with the device 110 that captured the user input.

The user recognition component 895 determines whether a user input originated from a particular user. For example, the user recognition component 895 may generate a first value representing a likelihood that a user input originated from a first user, a second value representing a likelihood that the user input originated from a second user, etc. The user recognition component 895 may also determine an overall confidence regarding the accuracy of user recognition operations.

The user recognition component 895 may output a single user identifier corresponding to the most likely user that originated the user input. Alternatively, the user recognition component 895 may output multiple user identifiers (e.g., in the form of an N-best list) with respective values representing likelihoods of respective users originating the user input. The output of the user recognition component 895 may be used to inform NLU processing, processing performed by a skill 890, as well as processing performed by other components of the system(s) 120 and/or other systems.

The system(s) 120 may include profile storage 870. The profile storage 870 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 870 may include one or more user profiles, with each user profile being associated with a different user identifier. Each user profile may include various user identifying information. Each user profile may include preferences of the user. Each user profile may include one or more device identifiers, representing one or more devices registered to the corresponding user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 870 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 870 may include one or more device profiles. Each device profile may be associated with a different device identifier. Each device profile may include various device identifying information. Each device profile may include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 10:
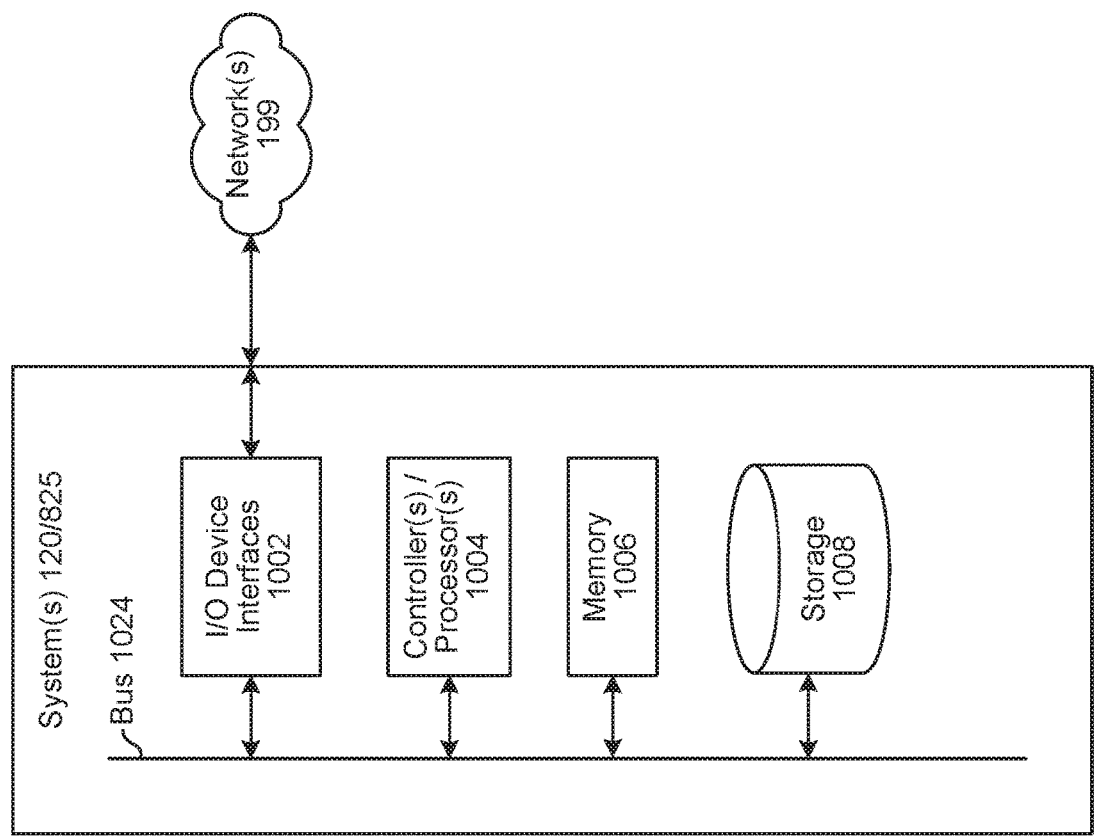
FIG. 10 is a block diagram conceptually illustrating example components of a server according to embodiments of the present disclosure.

FIG. 9 is a block diagram conceptually illustrating a device 110 that may be used with the system. FIG. 10 is a block diagram conceptually illustrating example components of a remote device, such as the system(s) 120, which may assist with ASR processing, NLU processing, etc., and the skill system(s) 825. A system (120/825) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/825) may be included in the overall system of the present disclosure, such as one or more systems 120 for performing ASR processing, one or more systems 120 for performing NLU processing, one or more skill systems 825, etc. In operation, each of these systems may include computer-readable and computer-executable instructions that reside on the respective device (120/825), as will be discussed further below.

Each of these devices (110/120/825) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/825) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/825) may also be connected to removable or external non-volatile memory and/or storage (such as a removable memory card, memory key drive, networked storage, etc.) through respective input/output device interfaces (902/1002).

Computer instructions for operating each device (110/120/825) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/825) includes input/output device interfaces (902/1002). A variety of components may be connected through the input/output device interfaces (902/1002), as will be discussed further below. Additionally, each device (110/120/825) may include an address/data bus (924/1024) for conveying data among components of the respective device. Each component within a device (110/120/825) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 825 may include their own dedicated processors, memory, and/or storage. Alternatively, one or more of the components of the device(s) 110, the system(s) 120, or the skill system(s) 825 may utilize the I/O interfaces (902/1002), processor(s) (904/1004), memory (906/1006), and/or storage (908/1008) of the device(s) 110 system(s) 120, or the skill system(s) 825, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 825, as described herein, are illustrative, and may be located as a stand-alone device or may be included, in whole or in part, as a component of a larger device or system.

Figure 11:
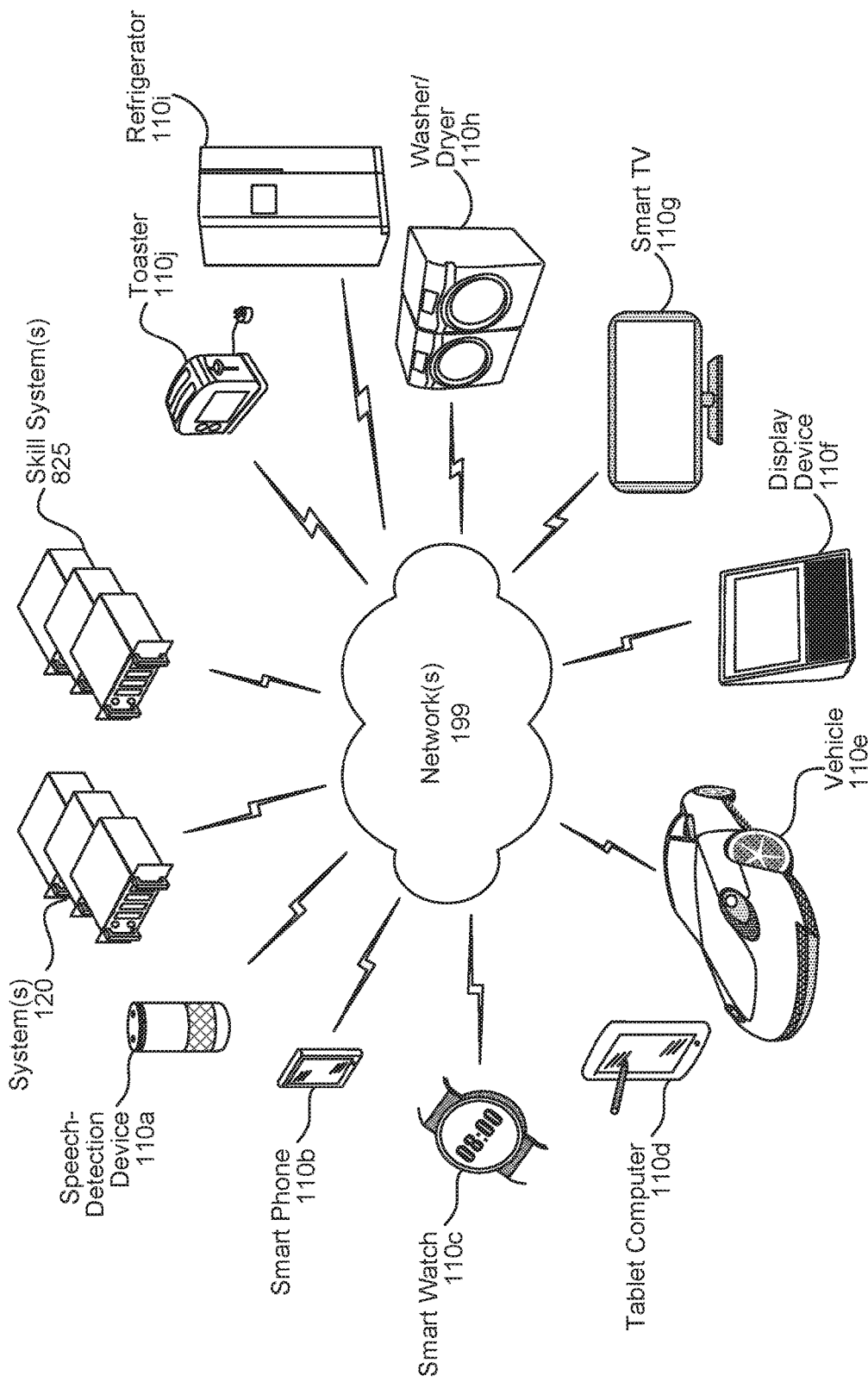
FIG. 11 illustrates an example of a computer network for use with the speech processing system.

As illustrated in FIG. 11, multiple devices (110a-110j, 120, 825) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 825, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, the NLU component 860, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A system, comprising:
   at least one processor; and
   at least one memory comprising instructions that, when executed by the at least one processor, cause the system to:
   receive a first indicator representing a device status of a first device corresponding to a first device identifier;
   after receiving the first indicator, determine a second device identifier, corresponding to a second device, is represented in a group of device identifiers including the first device identifier, the first device identifier and the second device identifier being represented in the group of device identifiers based at least in part on the first device and the second device each receiving same previously spoken audio including a wakeword;
   associate the second device identifier with a second indicator representing the second device is processing on behalf of the first device;
   send, to the first device, an instruction to ceasing processing of audio to detect the wakeword;
   receive, from the second device, audio data representing a spoken user input;
   determine the second device identifier is associated with the second indicator; and
   perform speech processing on the audio data as if the audio data was received from the first device.

2. The system of claim 1, wherein the at least one memory further comprises instructions that, when executed by the at least one processor, further cause the system to:
   receive a third indicator representing a second device status of the first device;
   after receiving the first indicator, receive, from the first device, a third device identifier corresponding to a third device connected to the first device using Bluetooth protocols;
   determine a profile associated with a plurality of device identifiers including the first device identifier;
   determine the profile is associated with the third device identifier; and
   send, to the first device, a second instruction to ceasing processing of second audio to detect the wakeword.

3. The system of claim 1, wherein the at least one memory further comprises instructions that, when executed by the at least one processor, further cause the system to:
   receive a third indicator representing a second device status of the first device;
   after receiving the third indicator, determine the first device is to be invoked to process second audio to detect the wakeword;
   disassociate the third indicator from the second device identifier;
   after disassociating the third indicator, receive, from the second device, second audio data representing a second spoken user input; and
   perform speech processing on the second audio data as if the second audio data was received from the second device.

4. The system of claim 1, wherein the at least one memory further comprises instructions that, when executed by the at least one processor, further cause the system to:
   receive a third indicator representing a second device status of the first device;
   receive a vehicle identifier corresponding to a vehicle to which the first device is connected using Bluetooth protocols;
   send, to the vehicle, a request for at least one device identifier representing at least one other device connected to the vehicle via Bluetooth protocols;
   receive, from the vehicle, a fourth indicator representing a third device is connected to the vehicle using Bluetooth protocols, the third device corresponding to a third device identifier;
   determine a profile associated with a plurality of device identifiers including the first device identifier;
   determine the profile is associated with the third device identifier; and
   send, to the vehicle, a second instruction to cause the first device to cease processing second audio to detect the wakeword.

5. A system, comprising:
   at least one processor; and
   at least one memory comprising instructions that, when executed by the at least one processor, cause the system to:
   receive an indicator representing a device status of a first device corresponding to a first device identifier;
   based at least in part on the device status, determine a second device identifier, corresponding to a second device, is represented in a group of device identifiers including the first device identifier; and based at least in part on determining the second device identifier is represented in the group of device identifiers, send, to the first device, an instruction to cease performing wakeword detection.

6. The system of claim 5, wherein the at least one memory further comprises instructions that, when executed by the at least one processor, further cause the system to:
receive a second indicator representing a second device status of the first device;
receive a vehicle identifier corresponding to a vehicle to which the first device is connected;
send, to the vehicle, a request for at least one device identifier representing at least one other device connected;
receive, from the vehicle, a third indicator representing a third device connected to the vehicle, the third device corresponding to a third device identifier;
determine a profile associated with a plurality of device identifiers including the first device identifier;
determine the profile is associated with the third device identifier; and
cause the first device to cease performing wakeword detection.

7. The system of claim 6, wherein the at least one memory further comprises instructions that, when executed by the at least one processor, further cause the system to:
cause the first device to cease performing wakeword detection by sending, to the vehicle, a second instruction to cause the first device to cease performing wakeword detection.

8. The system of claim 5, wherein the at least one memory further comprises instructions that, when executed by the at least one processor, further cause the system to:
receive a second indicator representing a second device status of the first device;
based at least in part on the second device status, receive, from the first device, a third device identifier corresponding to a third device connected to the first device via a wireless connection; and
cause the first device to cease performing wakeword detection.

9. The system of claim 5, wherein the at least one memory further comprises instructions that, when executed by the at least one processor, further cause the system to:
receive a second indicator representing a second device status of the first device;
based at least in part on the second device status, determine a profile associated with a plurality of device identifiers including the first device identifier and a third device identifier corresponding to a third device;
determine, in the profile, that the first device identifier is associated with first position data;
determine, in the profile, that the third device identifier is associated with second position data substantially corresponding to the first position data; and
cause the first device to cease performing wakeword detection.

10. The system of claim 5, wherein the at least one memory further comprises instructions that, when executed by the at least one processor, further cause the system to:
receive a second indicator representing a second device status of the first device;
based at least in part on the second device status, determine a profile associated with a plurality of device identifiers including the first device identifier and a third device identifier corresponding to a third device;
determine, in the profile, that the first device identifier is associated with network identifying information;
determine, in the profile, that the third device identifier is associated with the network identifying information; and
cause the first device to cease performing wakeword detection.

11. The system of claim 5, wherein the at least one memory further comprises instructions that, when executed by the at least one processor, further cause the system to:
determine a wakeword detection model associated with the first device identifier; and
send, to the second device, the wakeword detection model.

12. The system of claim 11, wherein the at least one memory further comprises instructions that, when executed by the at least one processor, further cause the system to:
receive a second indicator representing a second device status of the first device; and
based at least in part on the second indicator, send, to the second device, a second instruction to delete the wakeword detection model.

13. A method, comprising:
receiving an indicator representing a device status of a first device corresponding to a first device identifier;
based at least in part on the device status, determining a second device identifier, corresponding to a second device, is represented in a group of device identifiers including the first device identifier; and
based at least in part on determining the second device identifier is represented in the group of device identifiers, sending, to the first device, an instruction to cease performing wakeword detection.

14. The method of claim 13, further comprising:
receiving a second indicator representing a second device status of the first device;
receiving a vehicle identifier corresponding to a vehicle to which the first device is connected;
sending, to the vehicle, a request for at least one device identifier representing at least one other device connected;
receiving, from the vehicle, a third indicator representing a third device connected to the vehicle, the third device corresponding to a third device identifier;
determining a profile associated with a plurality of device identifiers including the first device identifier;
determining the profile is associated with the third device identifier; and
causing the first device to cease performing wakeword detection.

15. The method of claim 14, further comprising:
causing the first device to cease performing wakeword detection by sending, to the vehicle, a second instruction to cause the first device to cease performing wakeword detection.

16. The method of claim 13, further comprising:
receiving a second indicator representing a second device status of the first device;
based at least in part on the second device status, receiving, from the first device, a third device identifier corresponding to a third device connected to the first device via a wireless connection; and
causing the first device to cease performing wakeword detection.

17. The method of claim 13, further comprising:
receiving a second indicator representing a second device status of the first device;
based at least in part on the second device status, determining a profile associated with a plurality of device identifiers including the first device identifier and a third device identifier corresponding to a third device;
determining, in the profile, that the first device identifier is associated with first position data;
determining, in the profile, that the third device identifier is associated with second position data substantially corresponding to the first position data; and
causing the first device to cease performing wakeword detection.

18. The method of claim 13, further comprising:
receiving a second indicator representing a second device status of the first device;
based at least in part on the second device status, determining a profile associated with a plurality of device identifiers including the first device identifier and a third device identifier corresponding to a third device;
determining, in the profile, that the first device identifier is associated with network identifying information;
determining, in the profile, that the third device identifier is associated with the network identifying information; and
causing the first device to cease performing wakeword detection.

19. The method of claim 13, further comprising:
determining a wakeword detection model associated with the first device identifier; and
sending, to the second device, the wakeword detection model.

20. The method of claim 19, further comprising:
receiving a second indicator representing a second device status of the first device; and
based at least in part on the second indicator, sending, to the second device, a second instruction to delete the wakeword detection model.

* * * * *